United States Patent [19]

Wehrell

[11] Patent Number: 5,070,816
[45] Date of Patent: Dec. 10, 1991

[54] SPRINT TRAINING EXERCISE SYSTEM AND METHOD

[76] Inventor: Michael A. Wehrell, 2648 The Strand, Hermosa Beach, Calif. 90254

[21] Appl. No.: 489,678

[22] Filed: Mar. 7, 1990

[51] Int. Cl.⁵ .......................... A01K 29/00; A63B 5/00
[52] U.S. Cl. ...................................... 119/29; 272/100; 272/116
[58] Field of Search ............... 119/96, 29, 1; 272/100, 272/69, 116, 119, DIG. 9; 54/71

[56] References Cited

U.S. PATENT DOCUMENTS

| | | | |
|---|---|---|---|
| 779,243 | 1/1905 | Smith | 119/29 |
| 3,349,751 | 10/1967 | Frostad | 119/29 |
| 4,387,908 | 6/1983 | Kroger et al. | 119/29 |
| 4,854,572 | 8/1989 | Knight | 272/116 |

FOREIGN PATENT DOCUMENTS

| | | | |
|---|---|---|---|
| 277285 | 8/1988 | European Pat. Off. | 119/29 |
| 3106698 | 9/1982 | Fed. Rep. of Germany | 119/29 |
| 1268181 | 11/1986 | U.S.S.R. | 272/100 |

Primary Examiner—John G. Weiss
Attorney, Agent, or Firm—Rogers & Killeen

[57] ABSTRACT

An exercise system and method may be used by a variety of animals, including horses, dogs and humans, for conditioning an animal to run faster. An exercise track is defined by two spaced-apart railings. Each railing slidably carries a restraining device for providing a net force restraining an animal running on the exercise track. A harness conveys the net force from the restraining devices to the animal. An animal using the present invention may be conditioned to run at its full speed while being held back by the net restraining force, and is thereby conditioned to run faster when not so restrained. The restraining force may be generally parallel to the center line of the track on which the animal is running, and may be constant or varied. The restraining force may be created by suitable braking devices using aerodynamic drag, friction, magnetic resistance and the like.

39 Claims, 23 Drawing Sheets

SPRINT TRAINING EXERCISE SYSTEM AND METHOD

BACKGROUND OF THE INVENTION

The present invention relates to an exercise system and method for training animals to increase their running speed. More particularly, it relates to an exercise system and method wherein a restraining force is applied to a running animal to condition the animal to be able to run at higher speeds when the force is removed.

As used herein, the term "animal" refers to any animal amenable to training to increase running speed and includes, without limitation, horses, dogs and humans.

When an animal's body is repeatedly subjected to a strenuous physical activity which may tax both the musculatory and cardiovascular system, the body adapts and becomes conditioned to the repeated activity so that it can more efficiently perform the activity. For example, sprinters develop great leg strength and muscle mass because they must accelerate their whole body to high speeds quickly. Conversely, a marathon runner develops legs with leaner muscles because it is not energy efficient for a marathoner to carry a sprinter's physique for long distances.

In order to condition an animal to perform at a level beyond its current capability, the animal may engage in strenuous activity that exceeds its current level of conditioning. For example, a marathoner who wishes to improve his time may run longer distances in training than actually run in competition. The body will cardiovascularly adapt to accommodate the runner for a longer distance. The runner may then run a shorter distance faster than before the body underwent the cardiovascular adaptation.

This conditioning method, however, is not adaptable to animals who sprint at full speed, such as race horses, greyhounds and humans who race short distances. Obviously, animals that are being trained to run faster cannot condition their bodies by running faster than their current capability.

Weight training may be used by a sprinter to increase leg strength, but weight training has been shown to have a counterproductive affect. Leg exercises using free weight machines must be performed slowly due to the inertia of the weights. The increased strength which can come from increased muscle mass is not thereby optimized for speed motions. That is, the increased strength does not come with an equal increase in speed.

Further, the exercise movements performed while weight training cannot mimic the complex motion of the sprinter's body while actually sprinting. The sprinter's optimum muscular mechanical balance for speed can easily be disrupted after muscle tissues become stronger due to adaptation to the slow speed weight training. This disruptive effect requires a sprinter to continually train by sprinting in order to maintain their speed and muscular balance. Obviously, a closely monitored training program is required in order to maintain the balance of strength and speed. Further, not all animals are amenable to weight training, such as horses, dogs and some humans.

Techniques other than weight training are known that may increase a human's running speed. For example, the runner may be pulled by a car or winch. Such systems may not allow the runner to have a natural running motion because the runner's hands are restrained by holding the pulling device. Such systems are also inherently unsafe because the runner may fall and be dragged and are not adaptable to horses and dogs. (See U.S. Pat. No. 4,469,324, issued Sept. 4, 1984, to Dolan and U.S. Pat. No. 4,334,677, issued June 15, 1982, to Tata.)

It is also known that a runner's body may be restrained while running. Such systems, however, may also restrict the runner's natural running motion and may be operationally limited by the length of the restraint. (See, for example, U.S. Pat. No. 4,527,794, issued July 9, 1985, to Dunn and U.S. Pat. No. 3,519,269, issued July 7, 1970, to Howlett, et al.)

It is further known to use a device which sequentially pulls and restrains a human runner in different portions of the run. As with the separate pulling and restraining devices, the length of the run is fixed by the length of the pulling and/or restraining cables. (See, for example, Russian Patent No. 766,608 dated Sept. 30, 1980.)

These devices have a further significant disadvantage. Each of the pulling or restraining devices provides a force which tends to bring the runner back to the center line of the track on which he is running. That is, the runner cannot use the full width of the track without encountering a force tending to bring him back to the center of the track. This force is perpendicular to the runner's direction of motion and may disrupt the normal running motion of a sprinting animal. Moreover, the force may actually train horses and dogs to stay in the center of the track, countering their training and/or instincts to run on the inside of a turn.

Other devices are known that provide less intense exercise. In the horse training art, for example, it is known to use a railing mounted device to pull a horse around on an exercise track. Such devices, however, are not designed for speed training and do not condition the animal to perform at a level beyond that for which he is currently conditioned. They are merely replacements for a trainer or groom who would normally be used to exercise the animal. (See, for example, U.S. Pat. No. 4,619,222, issued Oct. 28, 1986, to Sundberg, et al., U.S. Pat. No. 4,232,630, issued Nov. 11, 1980, to Orlowski, et al., U.S. Pat. No. 4,138,966, issued Feb. 13, 1979, to Hesnault and U.S. Pat. No. 3,965,866, issued June 29, 1976, to Lorentz, et al.)

Other devices are known which restrict an animal to a particular location. Such devices are also not designed for speed training and include a restraining force that tends to pull the animal toward the center line of the exercise area. (See for example, U.S. Pat. No. 3,203,399 issued Aug. 31, 1965 to Banks.)

The exercise system and method of the present invention resolves many of the problems of the prior art and may be safely used by a variety of animals. The system generally includes two railings defining an exercise track therebetween. Each railing slidably carries a restraining device for jointly providing a net restraining force to an animal running on the exercise track. A harness is carried by the animal and is attached to the restraining devices to convey the net restraining force to the animal.

An animal using the present invention is conditioned to run at or near its full speed while being restrained by the restraining force. That is, the animal is sprinting while exceeding its current level of conditioning. When the restraint is removed, the animal's performance is thereby improved.

Each of the rail carried restraining devices may be adjusted to eliminate, or at least substantially reduce, the net of forces perpendicular to the center line of the track and thereby maintain the net restraining force generally parallel to the center line. The net restraining force also may be constant or varied by a trainer to fit a particular training program.

Various techniques may be used to provide the restraining force, including suitable braking devices using aerodynamic drag, friction, magnetic resistance and the like.

Accordingly, it is an object of the present invention to provide the novel sprint training exercise system for an animal which obviates the problem of the prior art and is safe to use by a variety of running animals.

It is another object of the present invention to provide a novel sprint training exercise system for an animal with a net restraining force that is parallel to the center line of the track the animal is using.

It is yet another object of the present invention to provide a novel sprint training exercise system for an animal with an endless running track.

It is still another object of the present invention to provide a novel sprint training exercise system for an animal with a net restraining force provided by braking devices movably carried by railings defining the animal's running track.

It is a further object of the present invention to provide a novel sprint training exercise system for an animal with an aerodynamic braking device.

It is still a further object of the present invention to provide a method for increasing the running speed of the animal that restrains the animal with a moveable restraining device.

These and many other objects and advantages will be readily apparent to those skilled in the art to which the invention pertains from a perusal of the claims, the appended drawings and the following detailed description of the preferred embodiments.

THE DRAWINGS

Figure 12A:
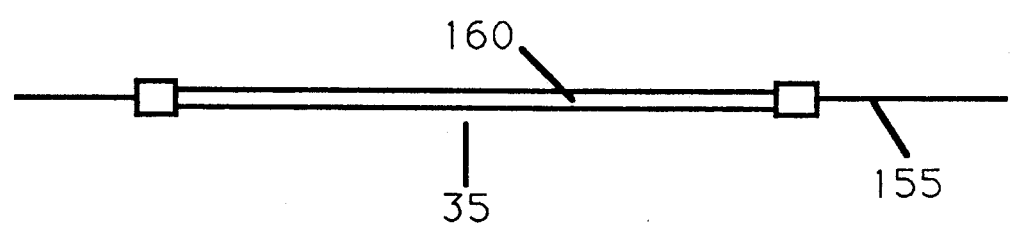

FIGS. 12A and B are pictorial depictions of embodiments of the shock absorption portion of the tether of the present invention.

Figure 13:
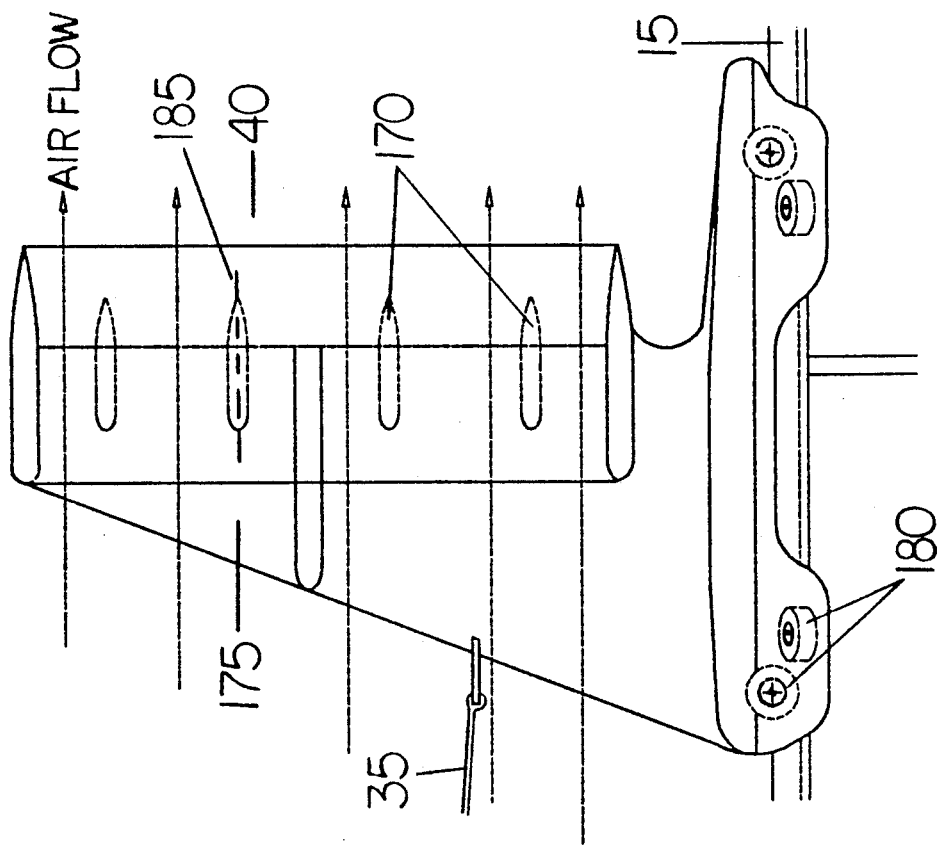

FIG. 13 is a pictorial depiction of a side view of an aerodynamic restraining device of the present invention.

Figure 14:
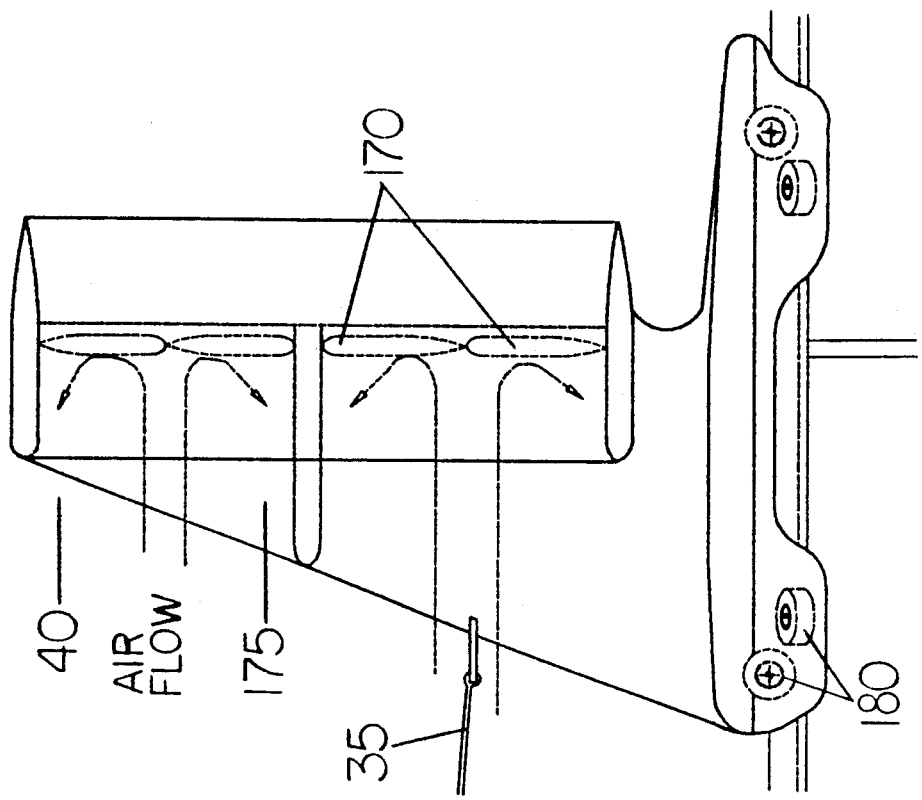

FIG. 14 is a pictorial depiction of a side view of the aerodynamic restraining device shown in FIG. 13 illustrating the operation of the louvers.

Figure 15:
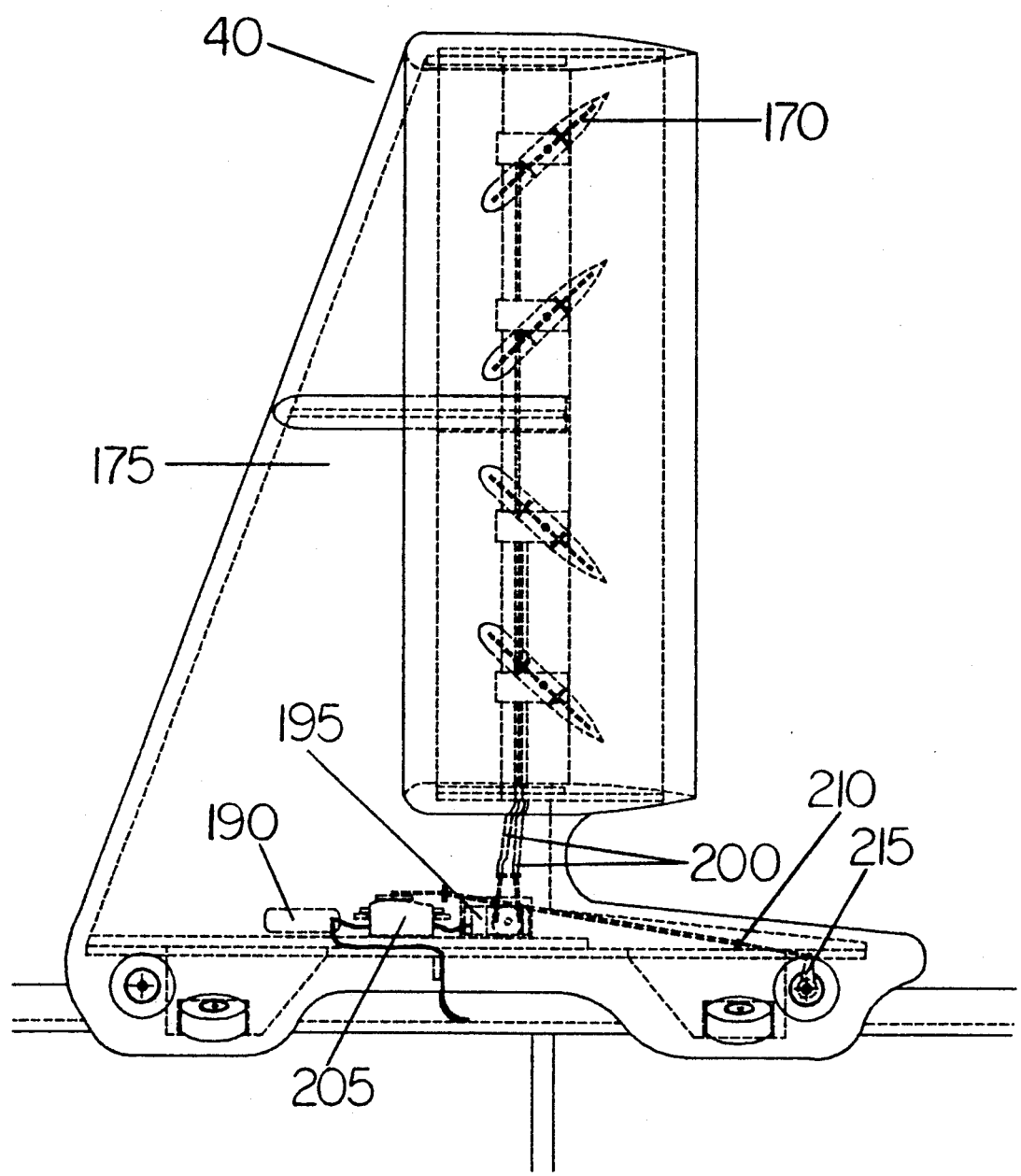

FIG. 15 is a pictorial depiction of a side view of the aerodynamic restraining device shown in FIG. 13.

Figure 16:
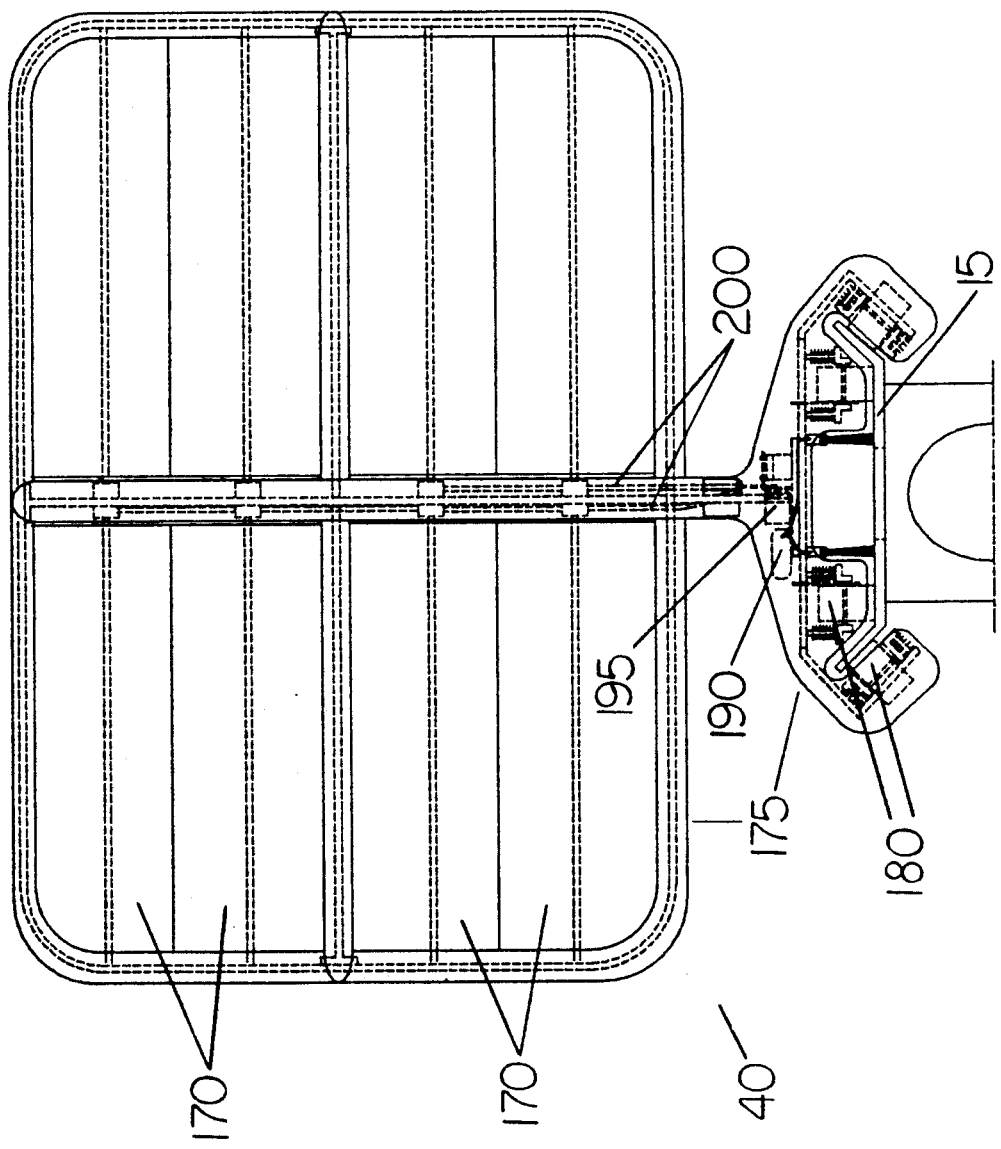

FIG. 16 is a partial pictorial and partial schematic of a front view of the aerodynamic restraining device shown in FIG. 13.

Figure 17:
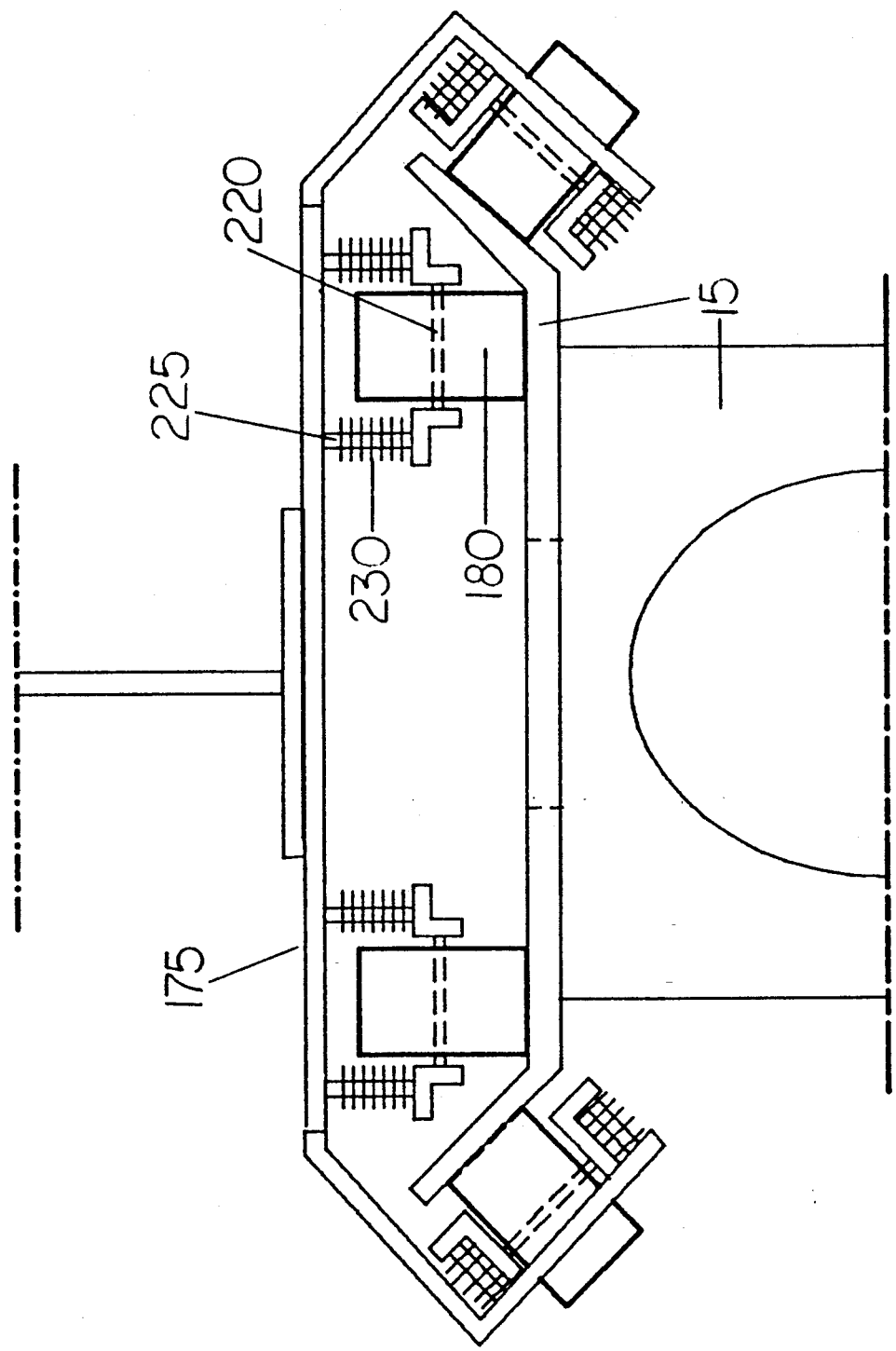

FIG. 17 is a partial pictorial depiction of a front view of the rollers and railing of the embodiment of the present invention shown in FIG. 13.

Figure 18:
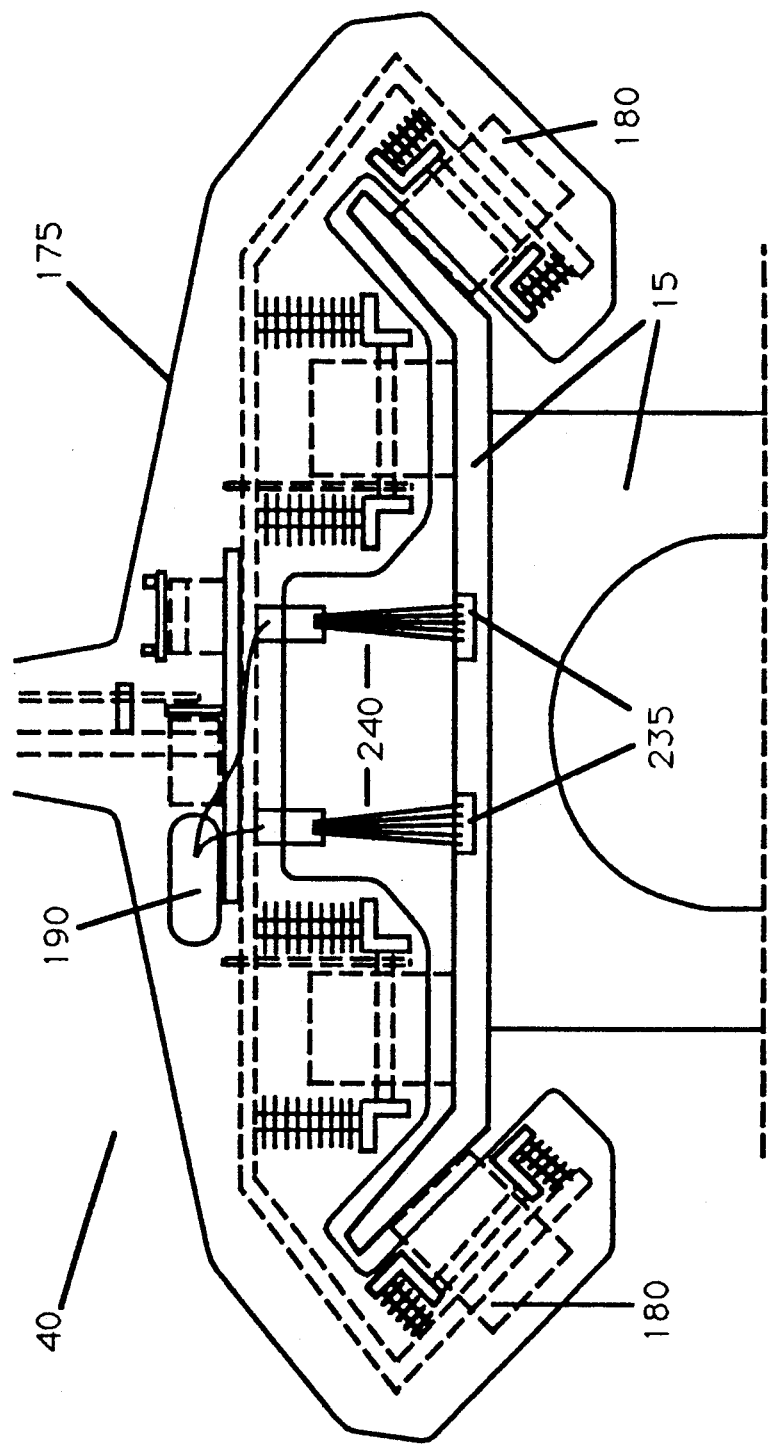

FIG. 18 is a partial pictorial depiction of a front view of the rollers and railing of the embodiment of FIG. 17 illustrating the interior thereof.

Figure 19:
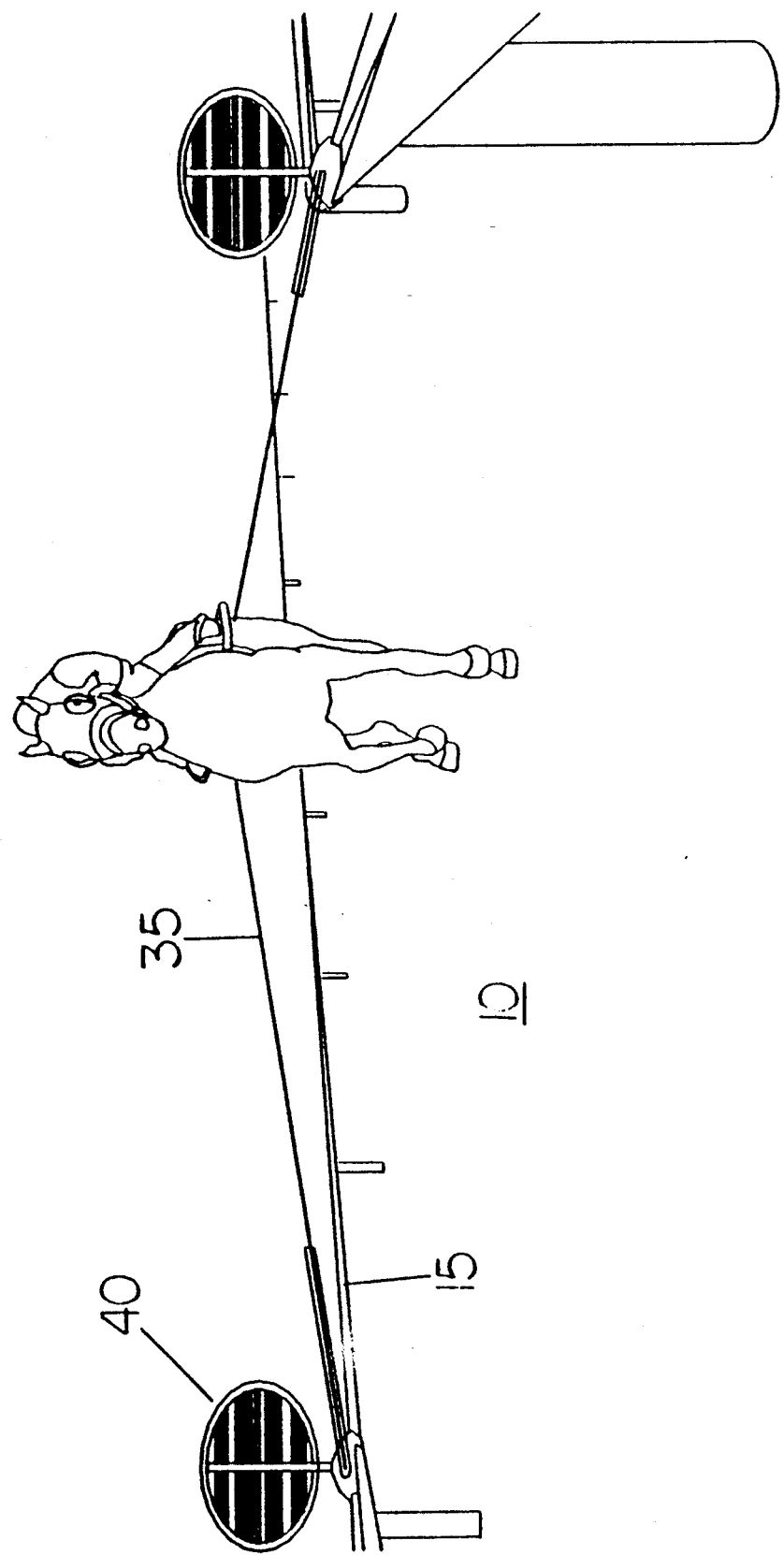

FIG. 19 is a pictorial depiction of an embodiment of the present invention in operation.

Figure 20:
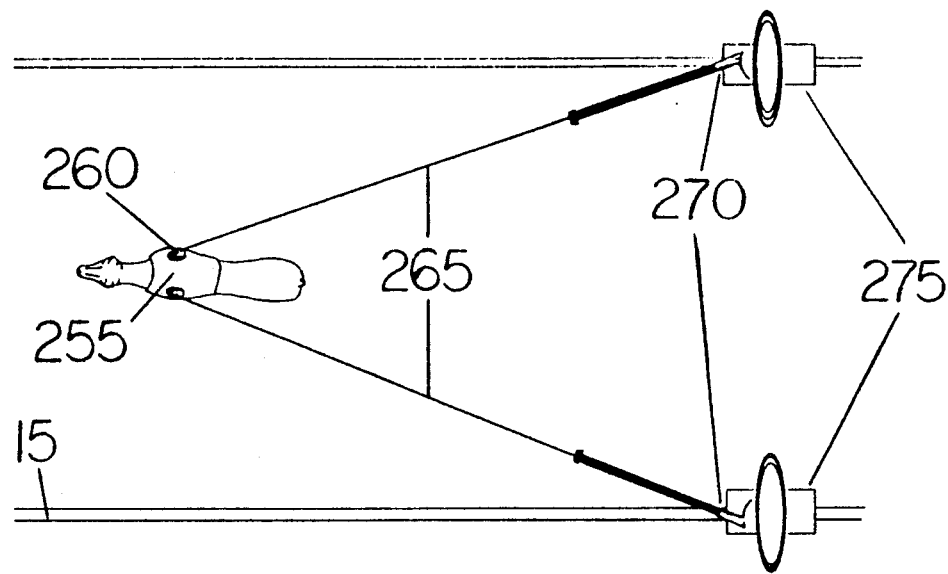

FIG. 20 is an overhead pictorial depiction of an embodiment of the present invention adaptable to a small animal, such as a dog, illustrating two movement arms.

Figure 21:
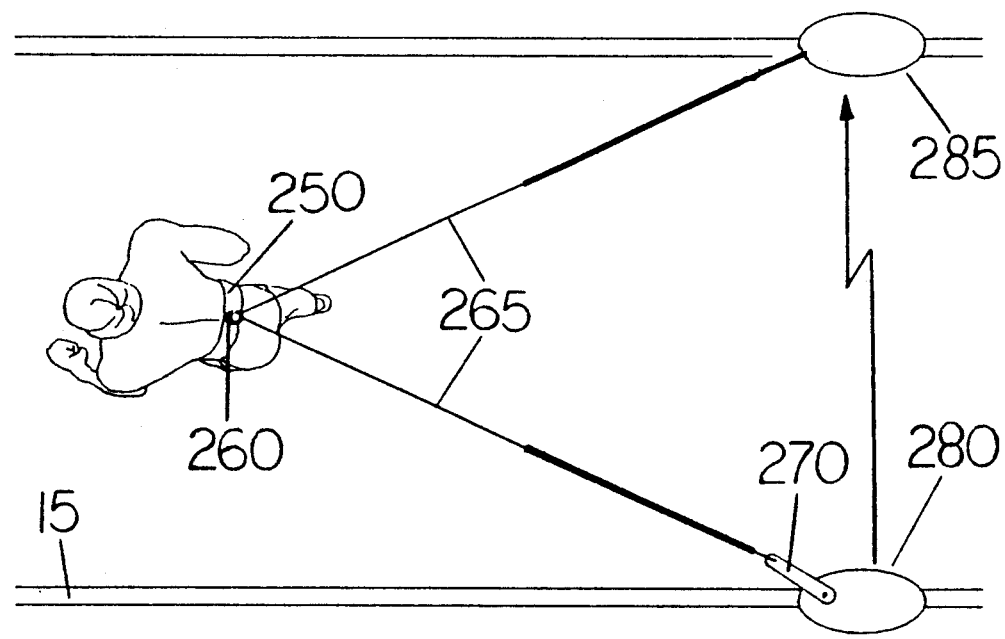

FIG. 21 is an overhead pictorial depiction of an embodiment of the present invention adaptable to a small animal, such as a human illustrating one movement arm.

Figure 22:
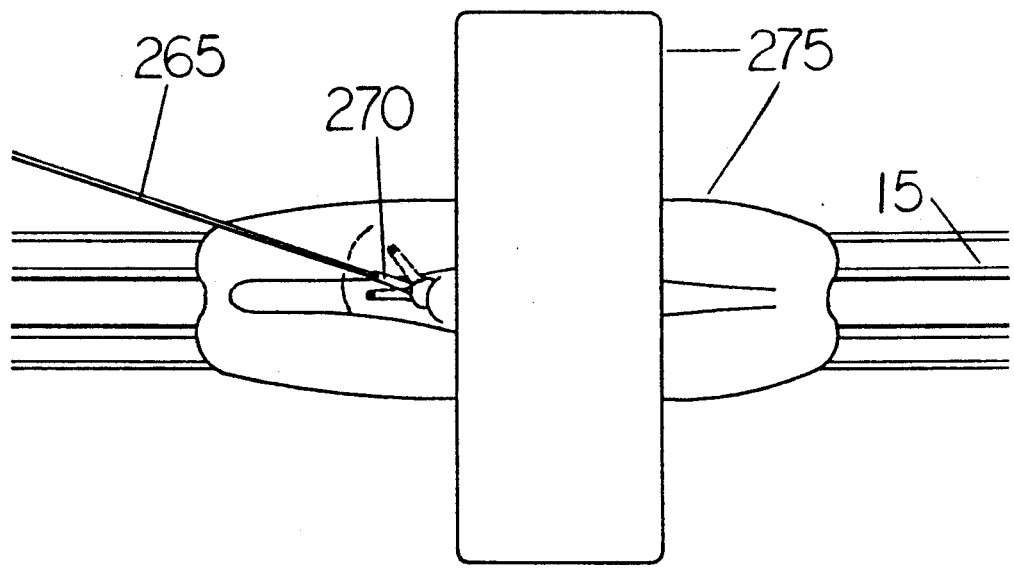

FIG. 22 is a partial overhead pictorial depiction of a restraining device in the present application with movement arm carried thereon.

Figure 23:
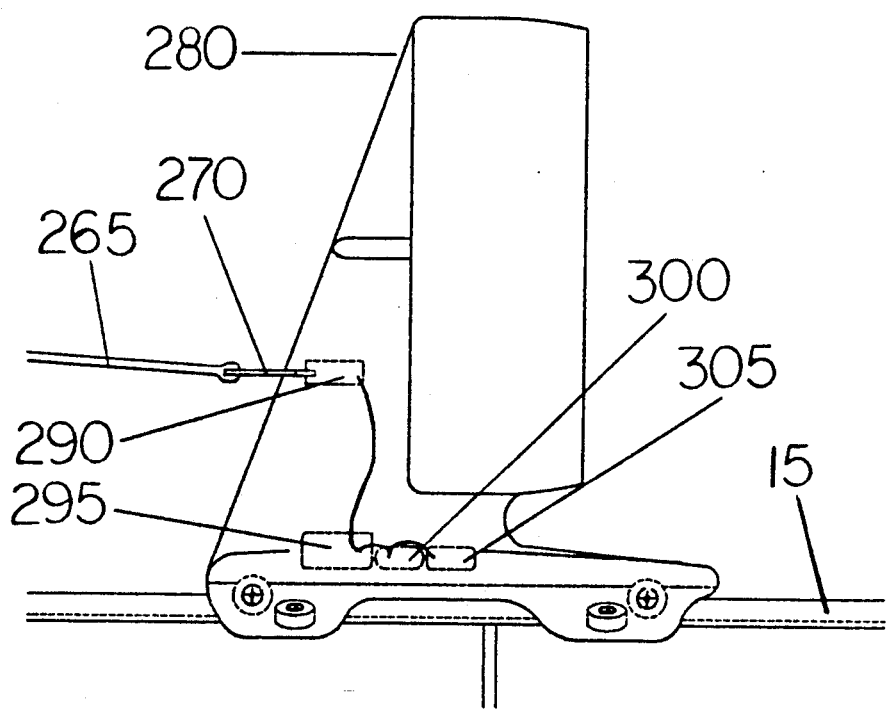

FIG. 23 is a partial pictorial and partial schematic of a side view of the restraining device of FIG. 22.

Figure 24:
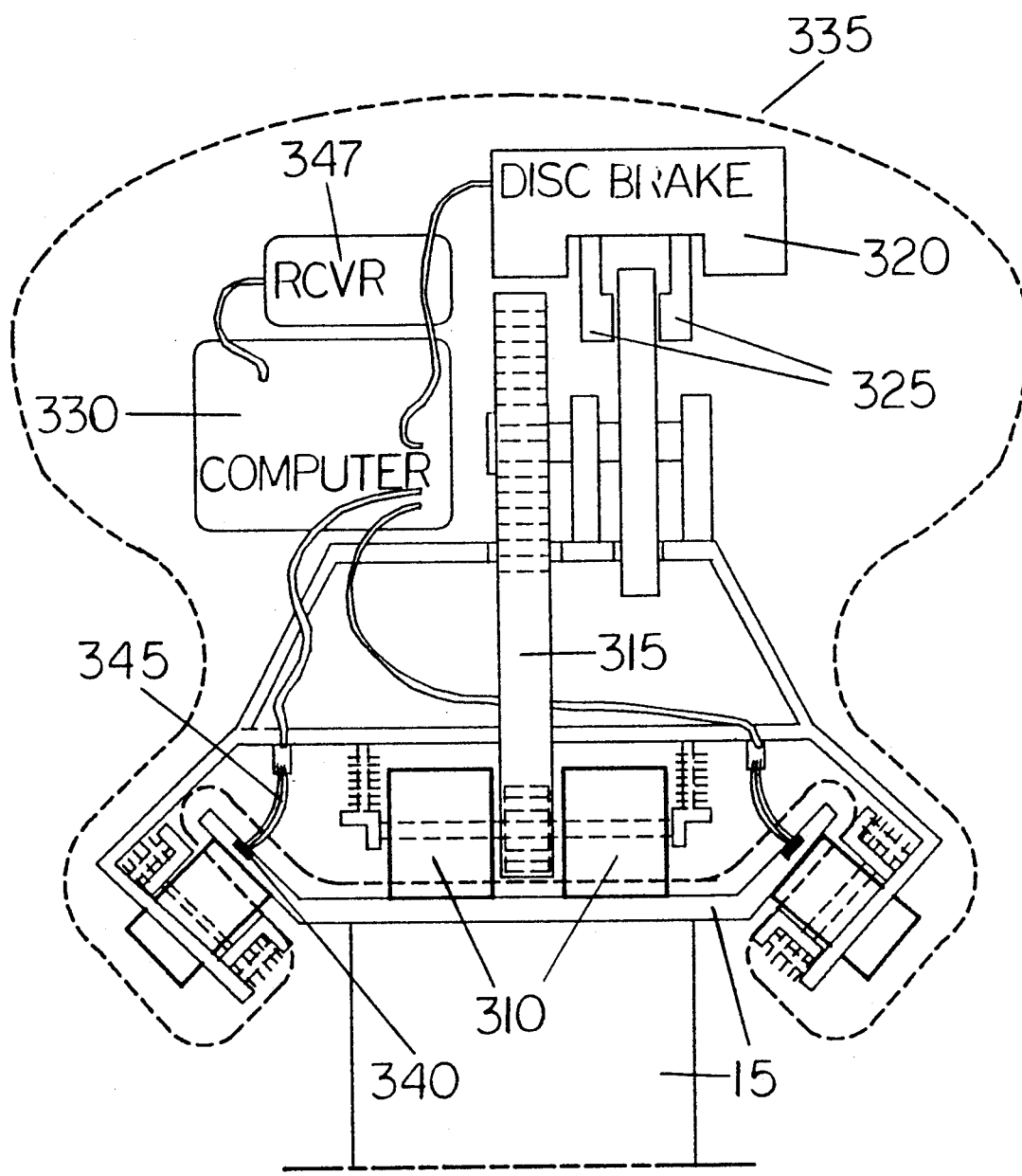

FIG. 24 is a partial schematic and partial pictorial depiction of a restraining device of the present invention illustrating a friction brake.

Figure 25:
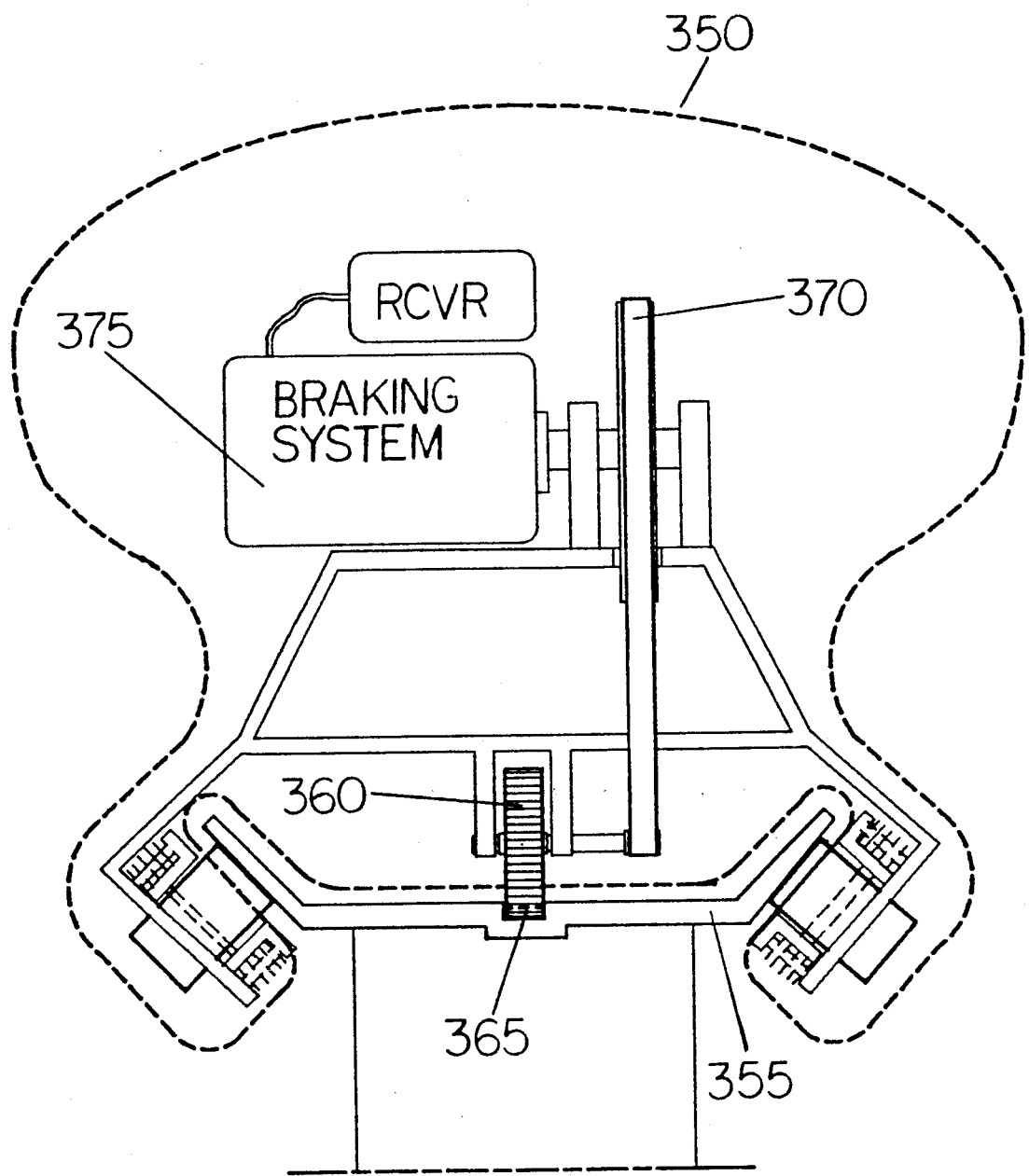

FIG. 25 is a partial schematic and partial pictorial depiction of a restraining device of the present invention illustrating the restraining device coupled to the railing.

Figure 26:
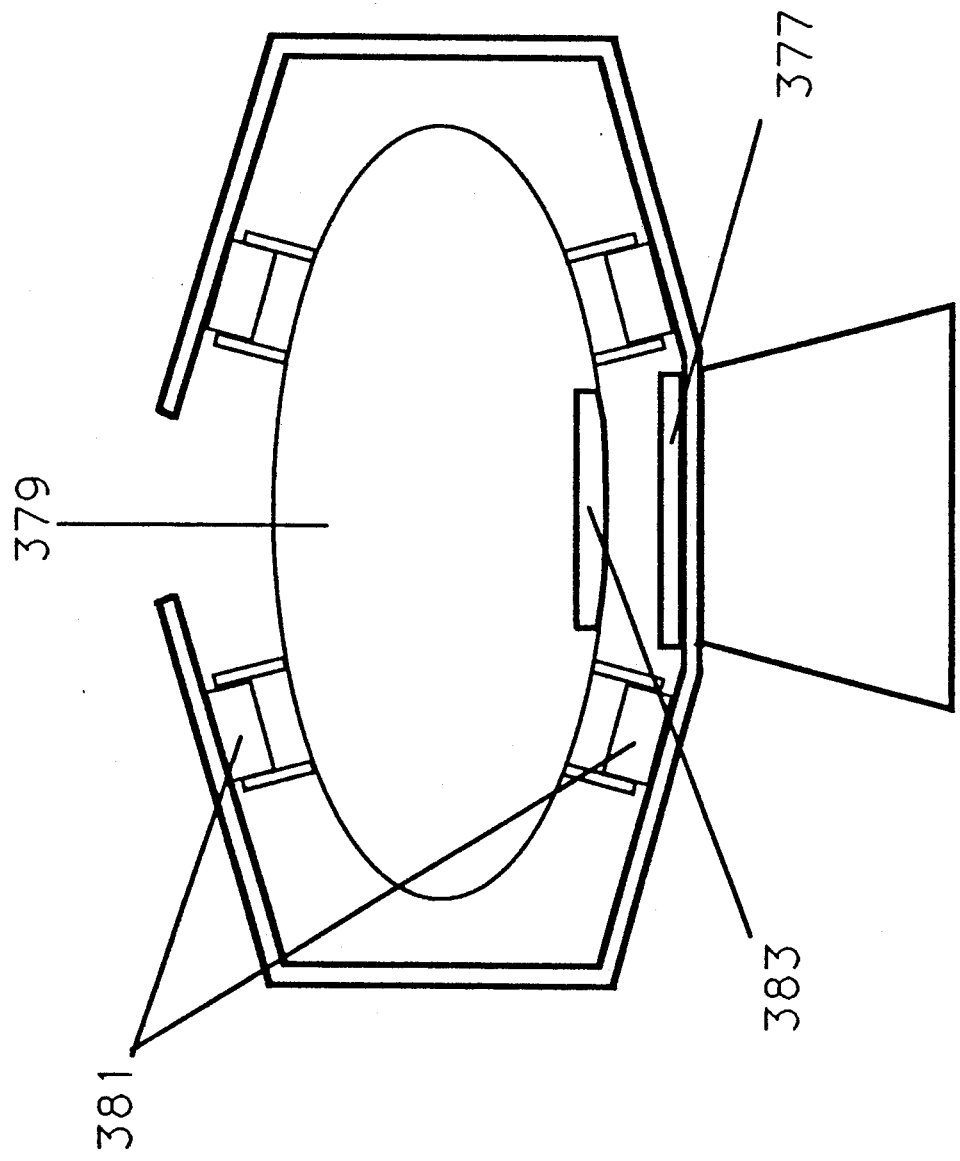

FIG. 26 is a front view of a schematic of an embodiment of the magnetic restraining device of the present invention.

Figure 27:
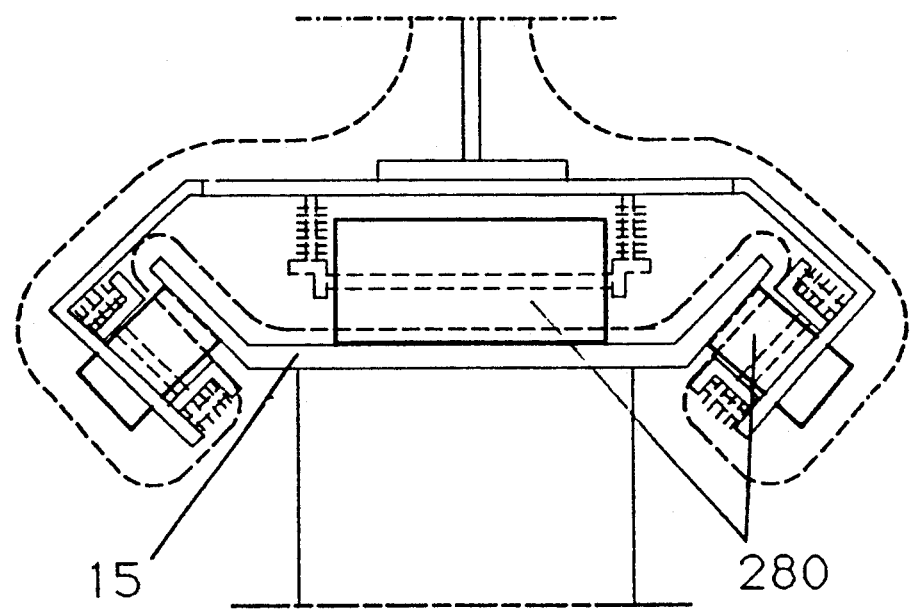

FIG. 27 is a partial pictorial depiction of an alternative embodiment of the rollers of the present invention.

Figure 28:
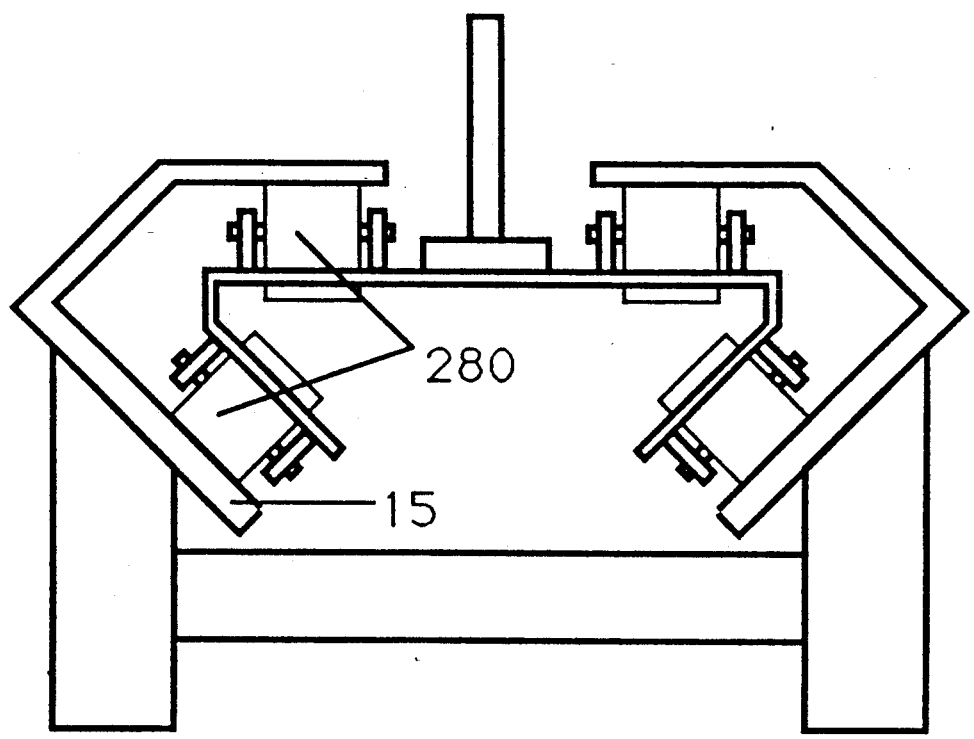

FIG. 28 is a partial pictorial depiction of another alternative embodiment of the rollers and railing of the present invention.

Figure 29:
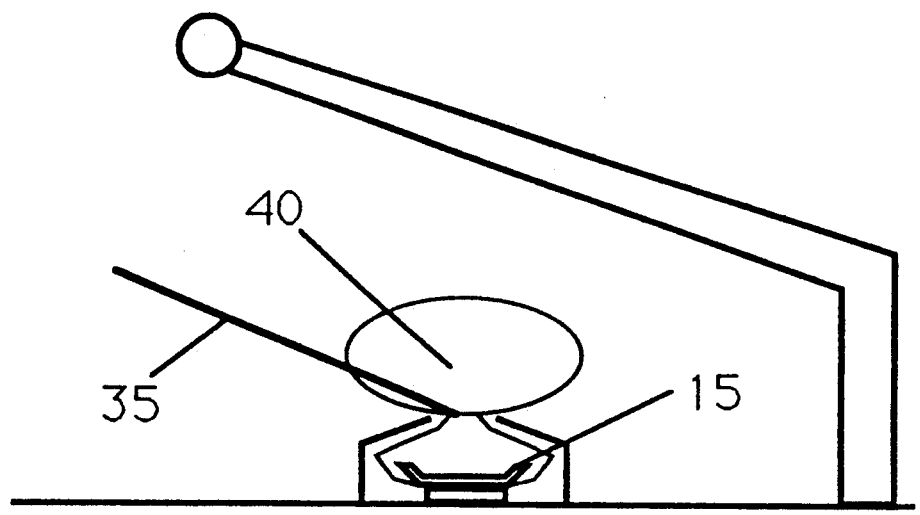

FIG. 29 is a pictorial depiction of an alternative embodiment of the railing of the present invention.

Figure 30:
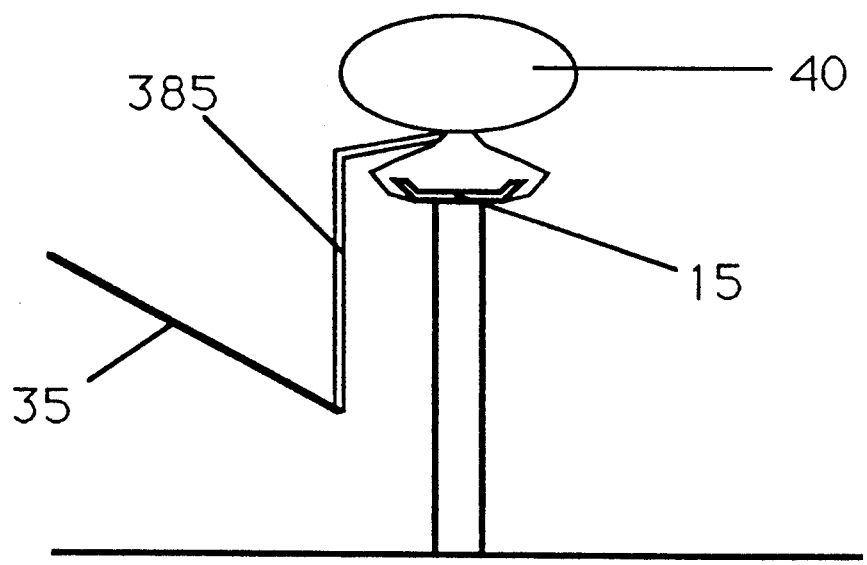

FIG. 30 is a pictorial depiction of a alternative embodiment of the restraining device of the present invention illustrating an extension arm.

Figure 31:
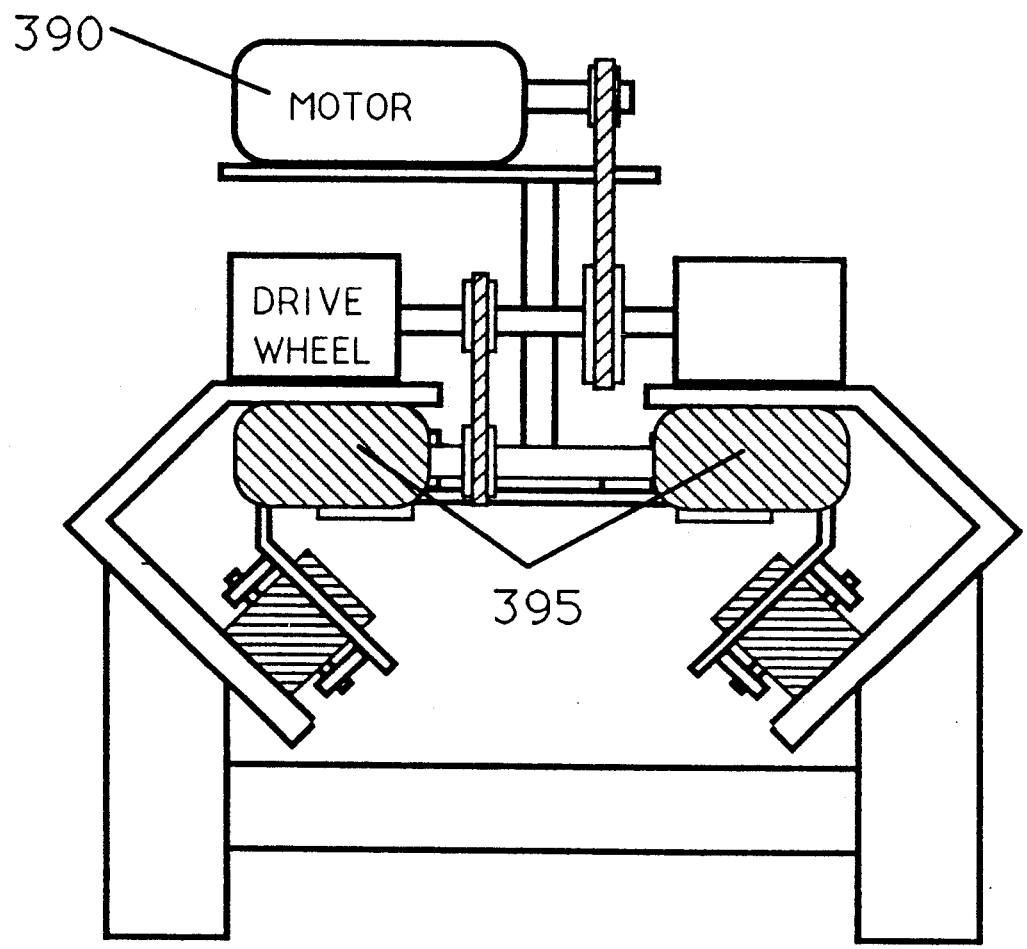

FIG. 31 is a partial pictorial and partial schematic depiction of a railing cleaner of the present invention.

DESCRIPTION OF PREFERRED EMBODIMENTS

Figure 1:
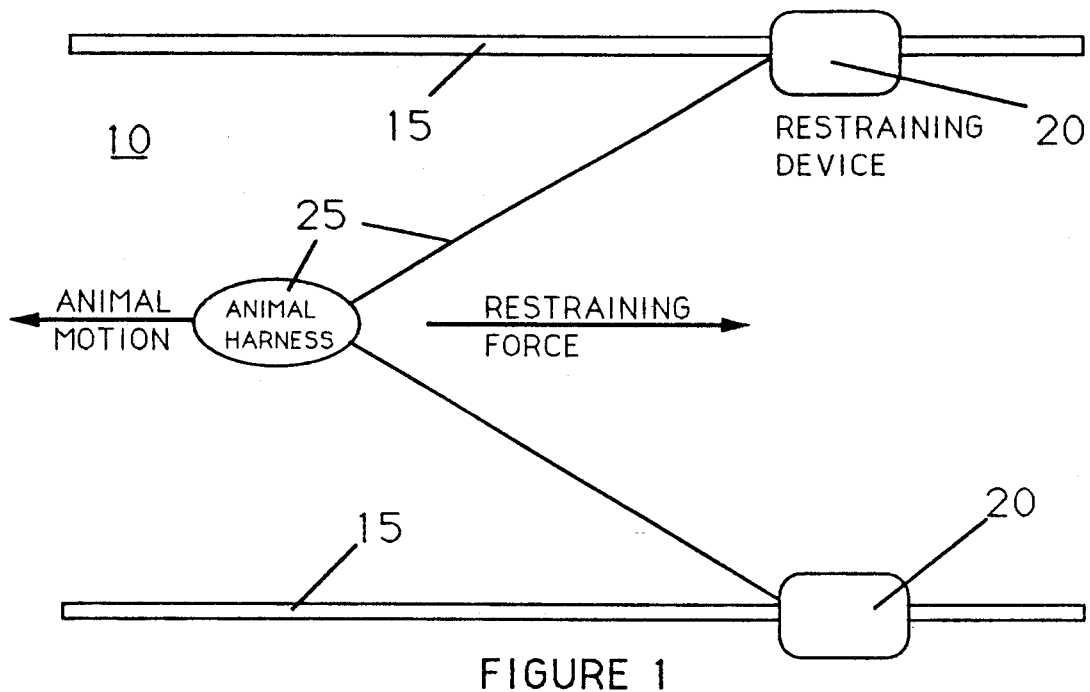
FIG. 1 is a schematic depiction of an embodiment of the present invention.
Figure 1A:
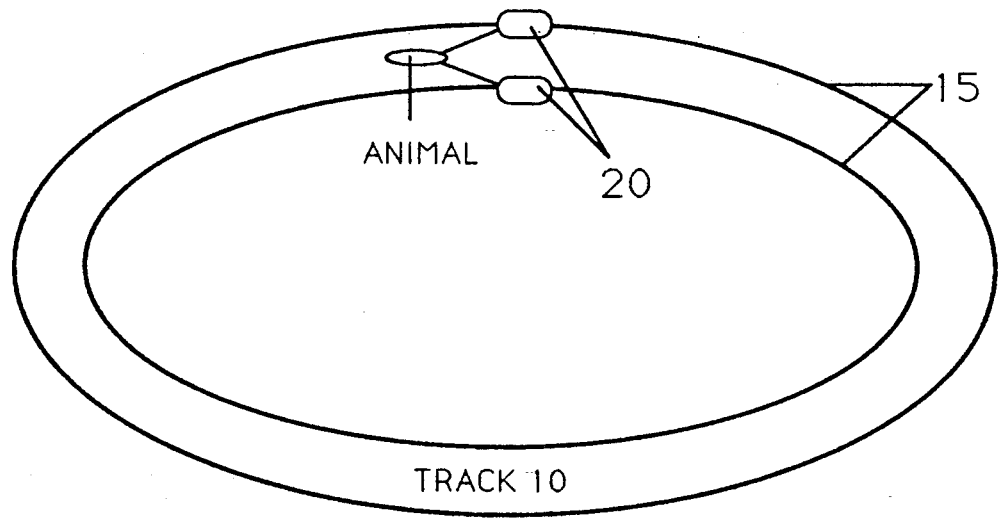
FIG. 1A is an overhead schematic depiction of an oval track embodying the present invention.

With reference now to the figures where like elements have been given like a numerical designation to facilitate an understanding of the present invention, and particularly with reference to the embodiment of the sprint training exercise system of the present invention illustrated in FIGS. 1 and 1A, the present invention may include an exercise track 10 defined by two spaced-apart railings 15, restraining devices 20 slideably carried by the railings 15 and a harness device 25 for coupling the restraining devices to an animal on the exercise track 10. The restraining devices 20 produce a net restraining force opposing motion of the animal running on the exercise track.

Each restraining device may include means for resisting its movement along the underlying railing. The resistance to movement in each device may be depicted as a force vector coincident with the railing and generally opposite to the direction of motion of the animal. In the present invention, the two force vectors are moved to the location of the animal by the harness device and combined into a net restraining force that is conveyed to the animal. Movement of the two force vectors from the railings to the animal introduces two lateral force vectors generally perpendicular to the railings that may also act upon the animal. It is desirable that the lateral force vectors substantially offset each other, and to that end the resistance to movement in each restraining device may be varied appropriately.

Figure 2:
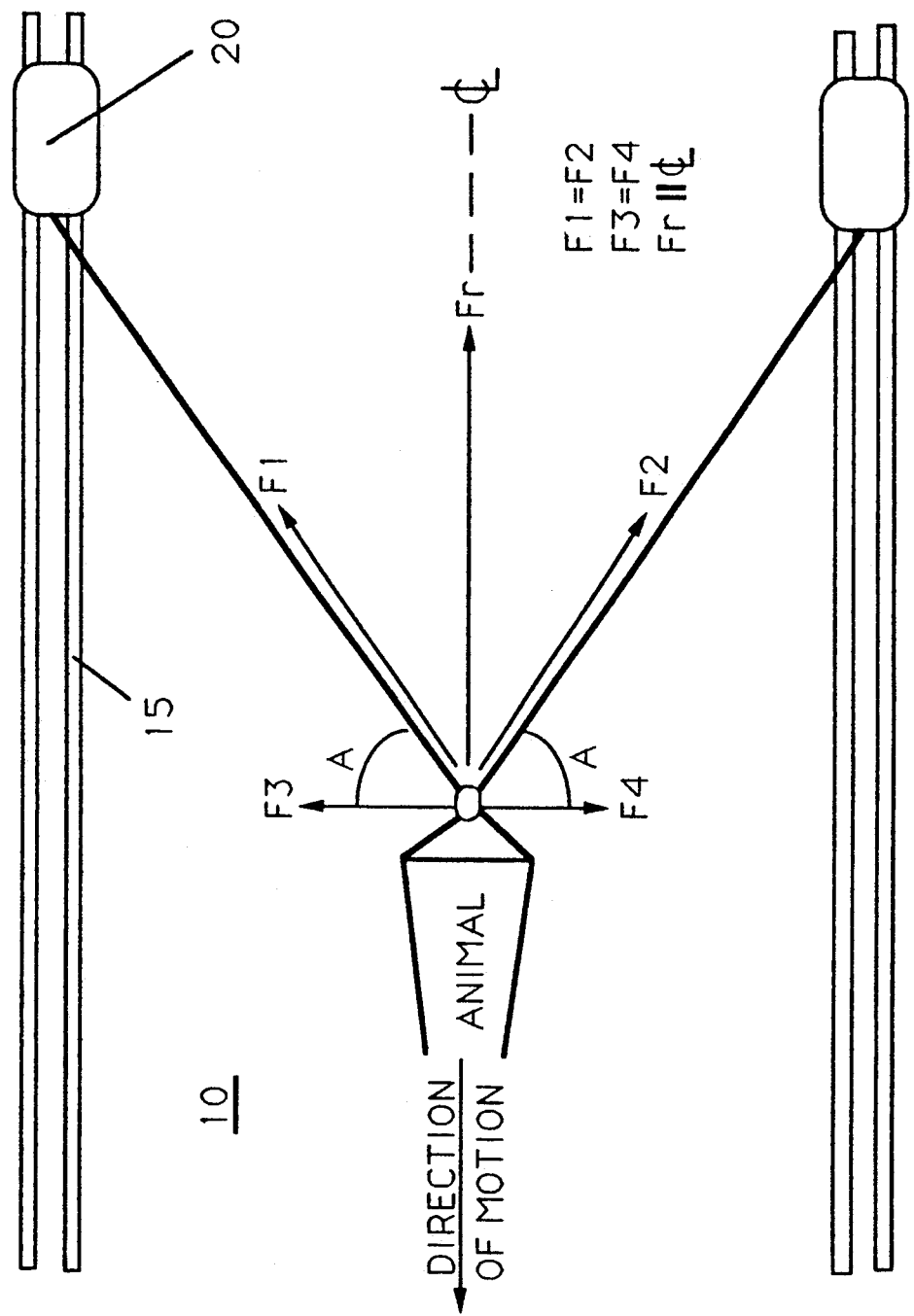
FIG. 2 is a schematic depiction of the embodiment shown in FIG. 1 illustrating the lines of force encountered by an animal running on the center line of the exercise track.
Figure 3:
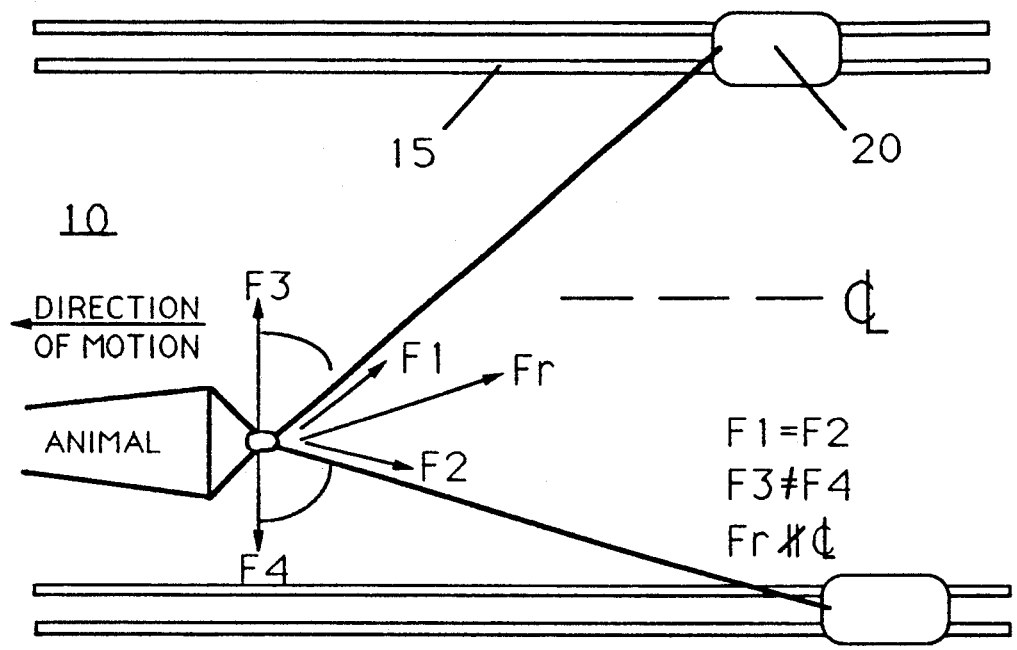
FIG. 3 is a schematic depiction of the embodiment shown in FIG. 1 illustrating the forces encountered by an animal running off the center line of the exercise track when the forces are not corrected.
Figure 4:
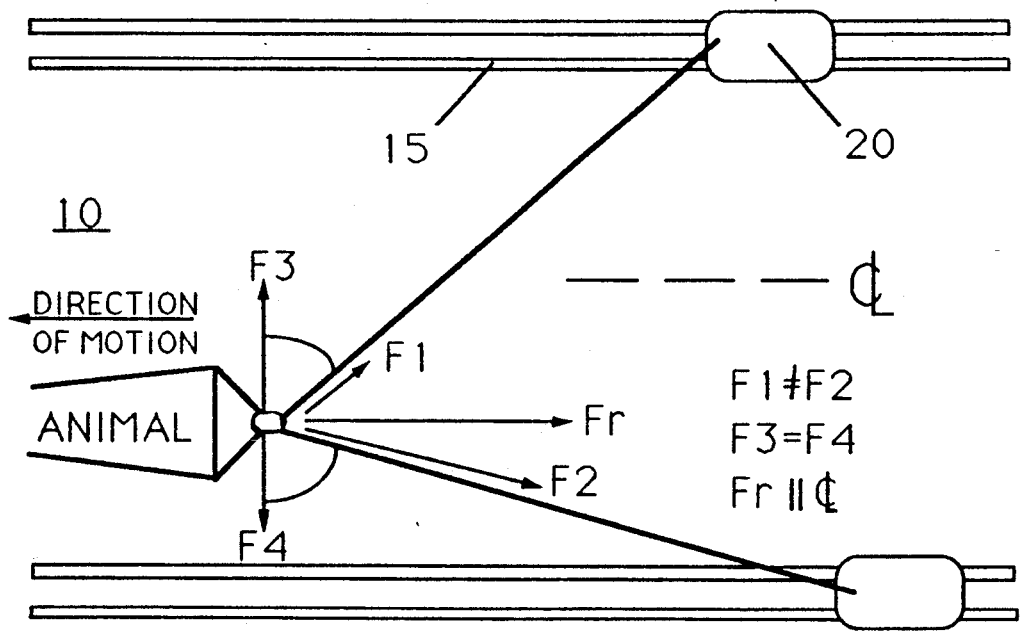
FIG. 4 is a schematic drawing of the embodiment shown in FIG. 1 illustrating the forces encountered by an animal running off of the center line of the exercise track when the forces are corrected.

The operation of the present invention may be more clearly seen with reference to FIGS. 2 through 4. As may be seen therein, an animal running on the exercise track 10 pulls the restraining devices 20 slideably carried by the railings 15. The restraining devices 20 create forces F1 and F2 which are independent and may be varied. The vector sum of F1 and F2 is the net restraining force Fr. Each of the forces F1 and F2 includes a lateral component perpendicular to the railings, F3 and F4 respectively. When an animal is running on the center line ₵ of the exercise track and forces F1 and F2 are equal, the force F3 and F4 are also equal and offsetting and the animal is not pulled to either side of the track. That is, Fr is parallel to the center line ₵ of the exercise track, the center line ₵ being defined as an imaginary line midway between the spaced part railings 15.

As may be seen in FIG. 3, when an animal runs off of the center line ₵ of the track and when the magnitudes of forces F1 and F2 are equal, the net restraining force Fr is no longer parallel to the center line of the track because the magnitude of lateral component F3 is larger than the magnitude of lateral component F4. If the magnitude of forces F3 and F4 are not equal, the resultant imbalance may pull the animal off balance, disrupting the animal's rhythm and endangering its safety.

With reference now to FIG. 4, when the imbalance illustrated in FIG. 3 is detected, the magnitudes of forces F1 and F2 may be adjusted to realign the net restraining force Fr parallel to the center line of the exercise track 10. That is, lateral components F3 and F4 are again offsetting.

It is readily apparent that the magnitudes of forces F1 and F2 may also be adjusted to set or maintain a particular net restraining force Fr. Fr may also be varied to fit a training program.

The exercise track 10 defined by the railings 15 may be straight or curved and may be endless, such as found in conventional oval horse racing, greyhound, or running tracks. See, for example, the track 10 in FIG. 1A. The railings 15 may take any form, and each may include a generally continuous surface to slideably carry the restraining devices without appreciable frictional resistance. The railings 15 should have sufficient structural strength to oppose forces F3 and F4.

Figure 5:
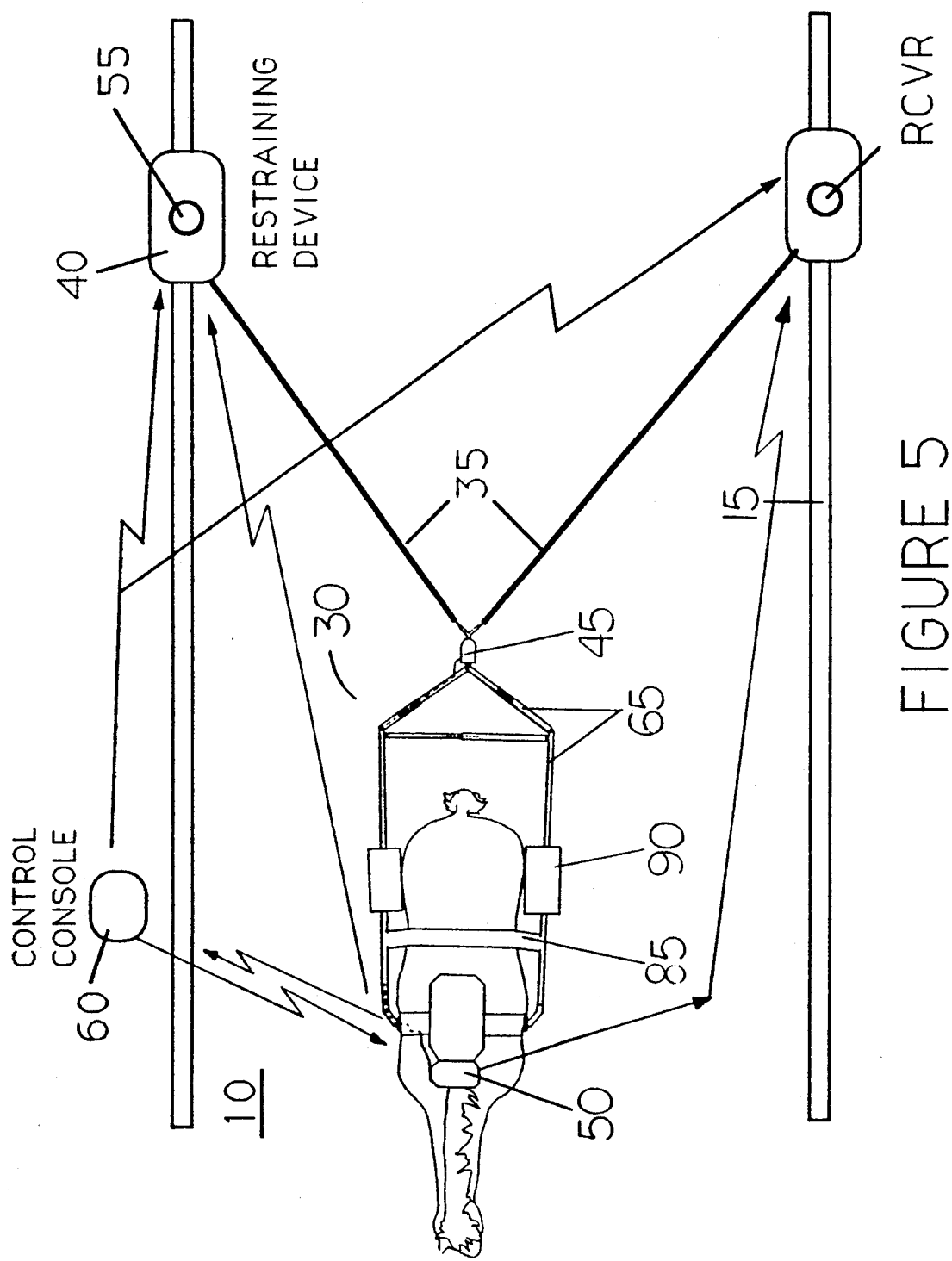
FIG. 5 is a pictorial illustration of an embodiment of the present invention adaptable to a large animal such as a horse.

With reference now to FIG. 5, wherein an embodiment of the present invention that may be used with a large animal such as a horse is illustrated, the present invention may include a harness 30 for a large animal, tethers 35 attaching the harness 30 to restraining devices 40 and a detection device 45 for sensing the net restraining force Fr and the net of lateral forces F3 and F4. The embodiment for a large animal may also include a transmitter 50 for transmitting force correction signals to the restraining devices 40 when the lateral forces F3 and F4 do not offset and when the net restraining force Fr varies from a desired value. Such transmission may be direct to a receiver 55 in the restraining devices 40 or through a control console 60 that may be operated by a trainer. Transmission may be accomplished by any appropriate method, such as via radio or a wire carried by tether 35.

In addition to relaying lateral and restraining force information to the restraining devices, the control console 60 may be used to control the magnitude of the net restraining force Fr during various stages of an animal's training run. For example, a trainer may use the console 60 to vary Fr during the animal's run to fit a particular training program.

Figure 6:
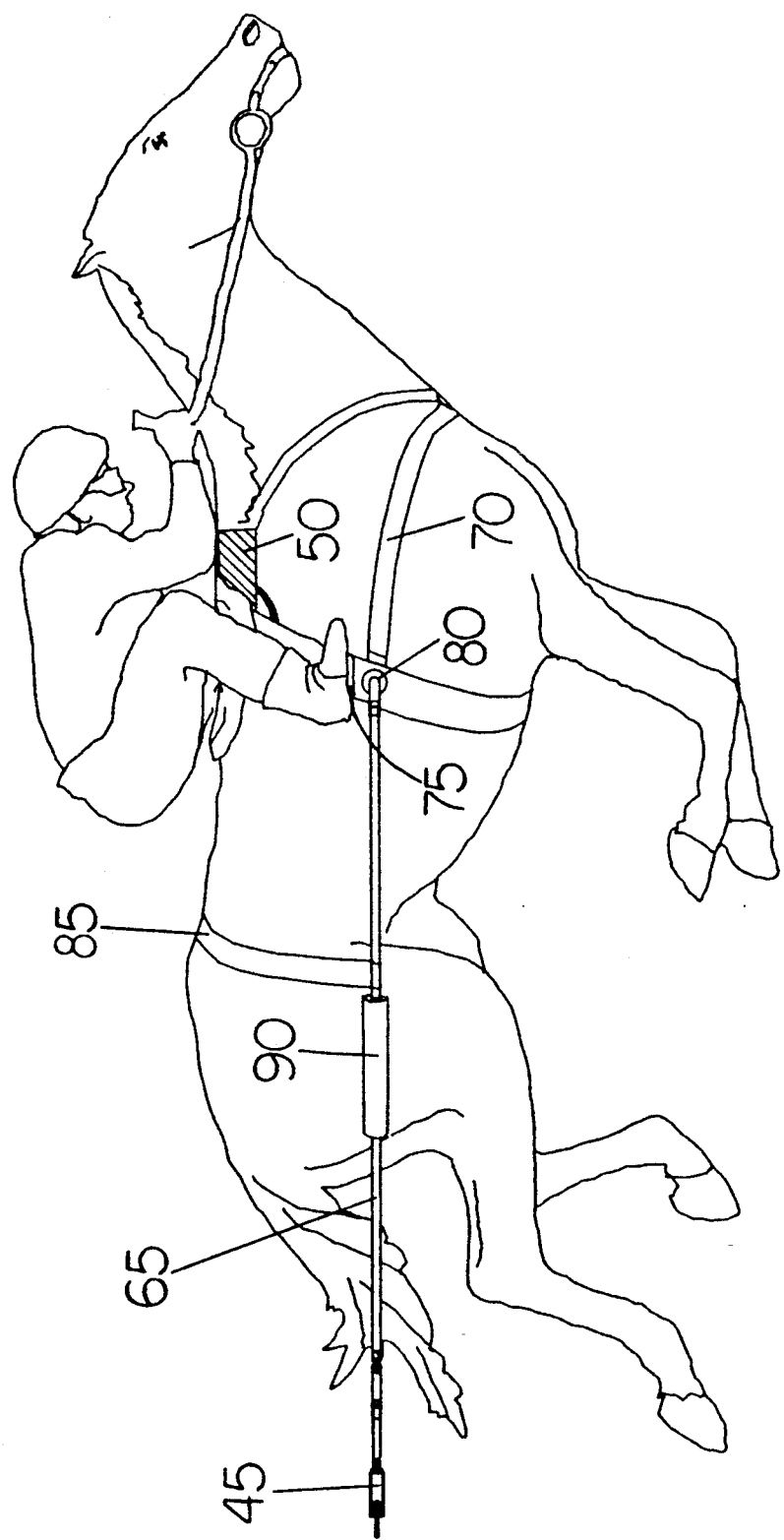
FIG. 6 is a pictorial depiction of a horse wearing the harness shown in FIG. 5.

The harness 30 may convey the net restraining force Fr to the animal in such a way that the animal is not encumbered by an element that may hinder the animal's normal running motion and its ability to reach maximum running speed. Such harnesses are generally known in the horse racing art and may include, without limitation, conventional harnesses used with jockey-ridden horses, sulkies and the like. As may be seen in FIGS. 5, 6 and 7, the harness 30 may include a lightweight V-shaped rig 65 and an attachment device 70 for attaching the rig 65 to the animal, such as a strap or a front piece that covers the front of the animal (not shown). The attachment device 70 may disperse the restraining force over the chest of the animal. The rig 65 may be attached to the attachment device 70 just below the stirrup 75. The connector 80 between the rig 65 and the attachment device 70 may be pivoted so that the apex of the V-shaped rig 65 may be relatively stable vertically when the horse is running. A strap 85 may be used to support the rig 65 when the horse is not running. Appropriate padding such as flank pads 90 may be added as necessary.

Figure 7:
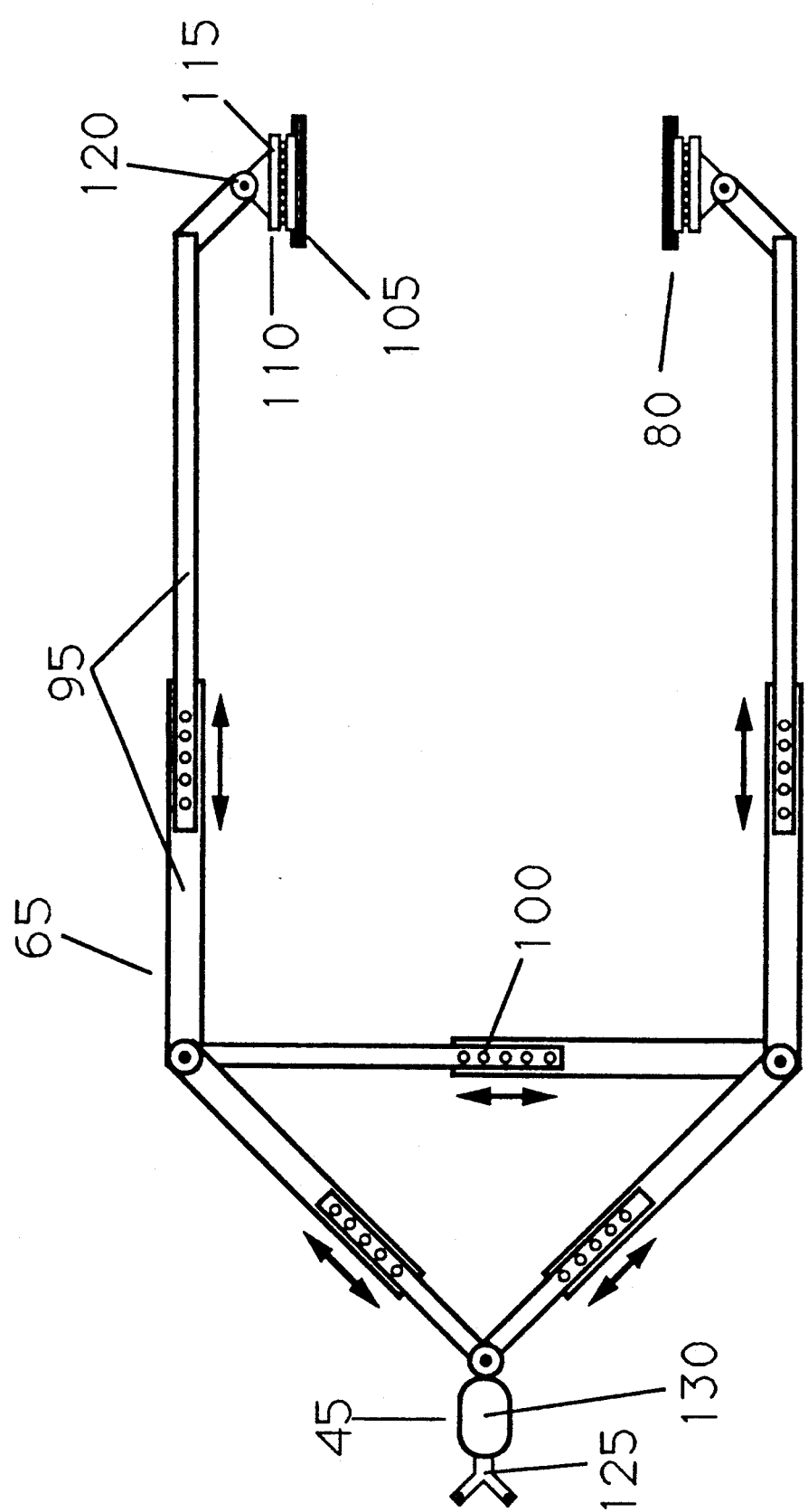
FIG. 7 is a pictorial depiction of the V-shaped rig of the harness shown in FIG. 5.

With further reference to FIG. 7, the rig 65 may be adjustable to various sizes of large animals and may be constructed of graphite composites to be lightweight. The rig 65 may include sliding members 95 with appropriate apertures 100 through which a pin may be placed to set the size of the rig 65. The connector 80 between the rig 65 and the attachment device 70 may include a plate 105 attached to device 70 just below the stirrup 80 and a pivoting unit 110 removably attached to plate 105 that allows the front of the rig 65 to move freely responsive to animal movement, while allowing the rear of the rig to remain relatively stable. The pivoting unit 110 may include a face plate 115 rotating on bearings and a hinge 120. This arrangement prevents the application of torque to plate 105 when the animal is not aligned with the rig 65 (e.g., when the animal yaws or pitches relative to the rig).

Figure 8:
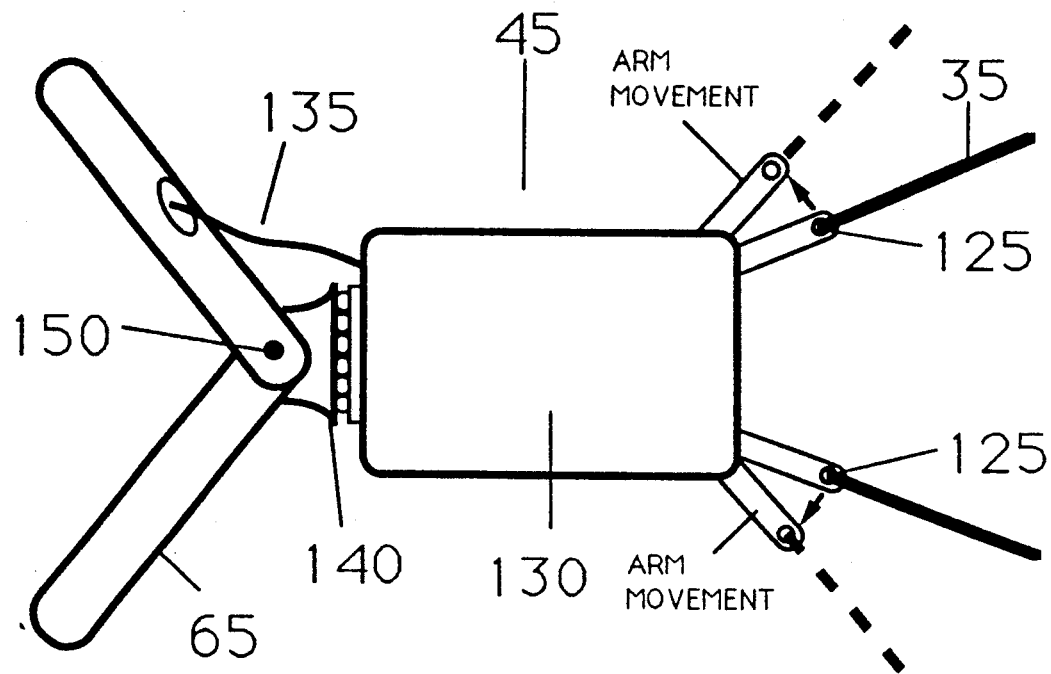
FIG. 8 is a pictorial depiction of the detection device in the harness of the embodiment of FIG. 5.
Figure 9:
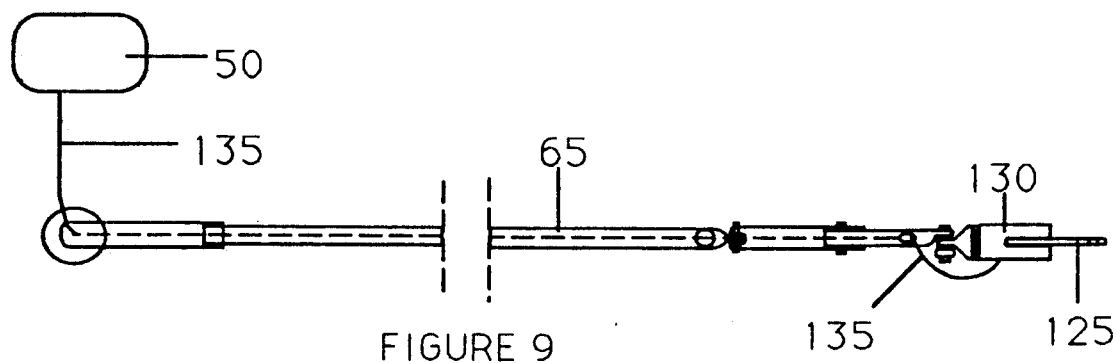
FIG. 9 is a pictorial depiction of the cable run in the harness shown in FIG. 5.

With reference now to FIG. 8, the detection device 45 may include independently moveable arms 125 and a sensor 130 for detecting angular displacement of the moveable arms 125. The sensor 130 may also be used to sense the restraining force Fr. The arms 125 may move laterally responsive to motion of the animal away from the center line of the exercise track. The sensor 130 may sense the angular displacement of the arms 125 and the net restraining force Fr and translate this information into a data signal. The data signal may take any form, such as analog or digital. The information in the data signal may be used by the restraining devices to adjust the forces F1 and F2 to maintain Fr parallel to the center line ₵ and/or to adjust the magnitude of Fr. As may be seen in FIGS. 6, 8 and 9 the data signal from the sensor may be routed via cable 135 to transmitter 50. The cable 135 may run inside the rig 65.

Figure 8A:
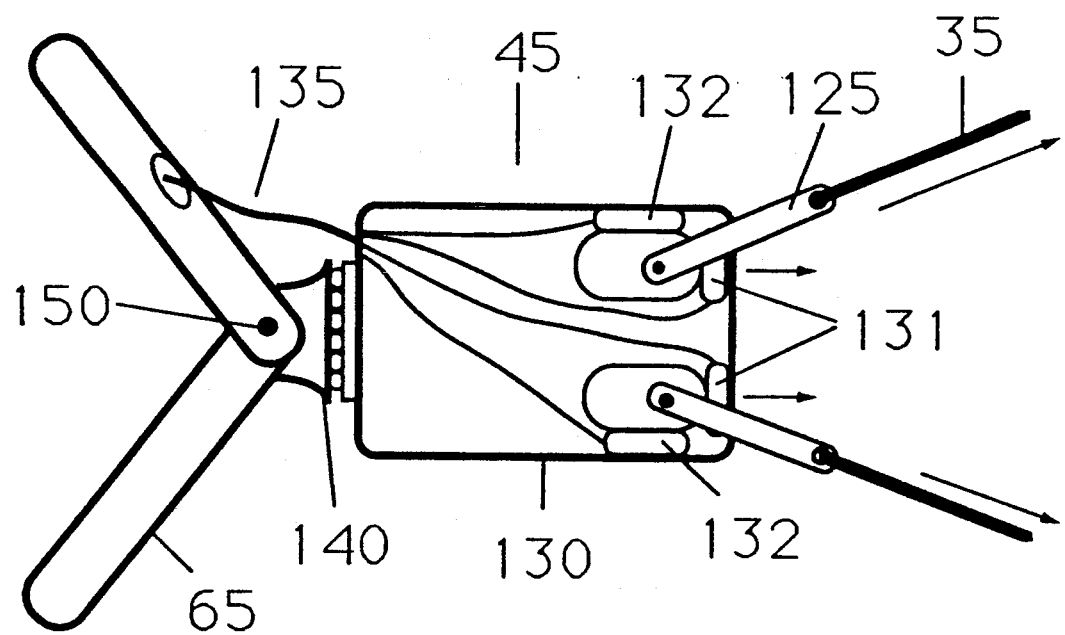
FIG. 8A is a schematic drawing of the detection device shown in FIG. 8.

With reference now to FIG. 8A sensor 130 may include restraining force pressure sensors 131 and lateral force pressure sensors 132. Through pressure sensors 131 and 132, the movement of each arm 125 may be monitored electronically to sense lateral and restraining forces.

Alternatively, the moveable arm 125 may, as seen in FIG. 7, be Y-shaped with a single point of attachment to the sensor 130. Pressure sensors similar to those shown in FIG. 8A may be used to sense lateral and restraining and forces.

Figure 10:
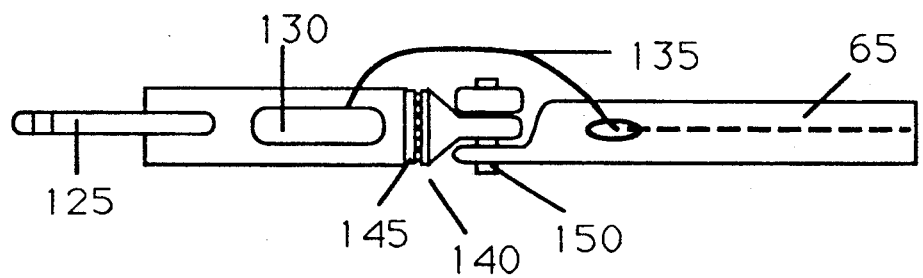
FIG. 10 is a pictorial depiction of the connection of the movement arm to the V-shaped rig in the harness shown in FIG. 5.
Figure 11:
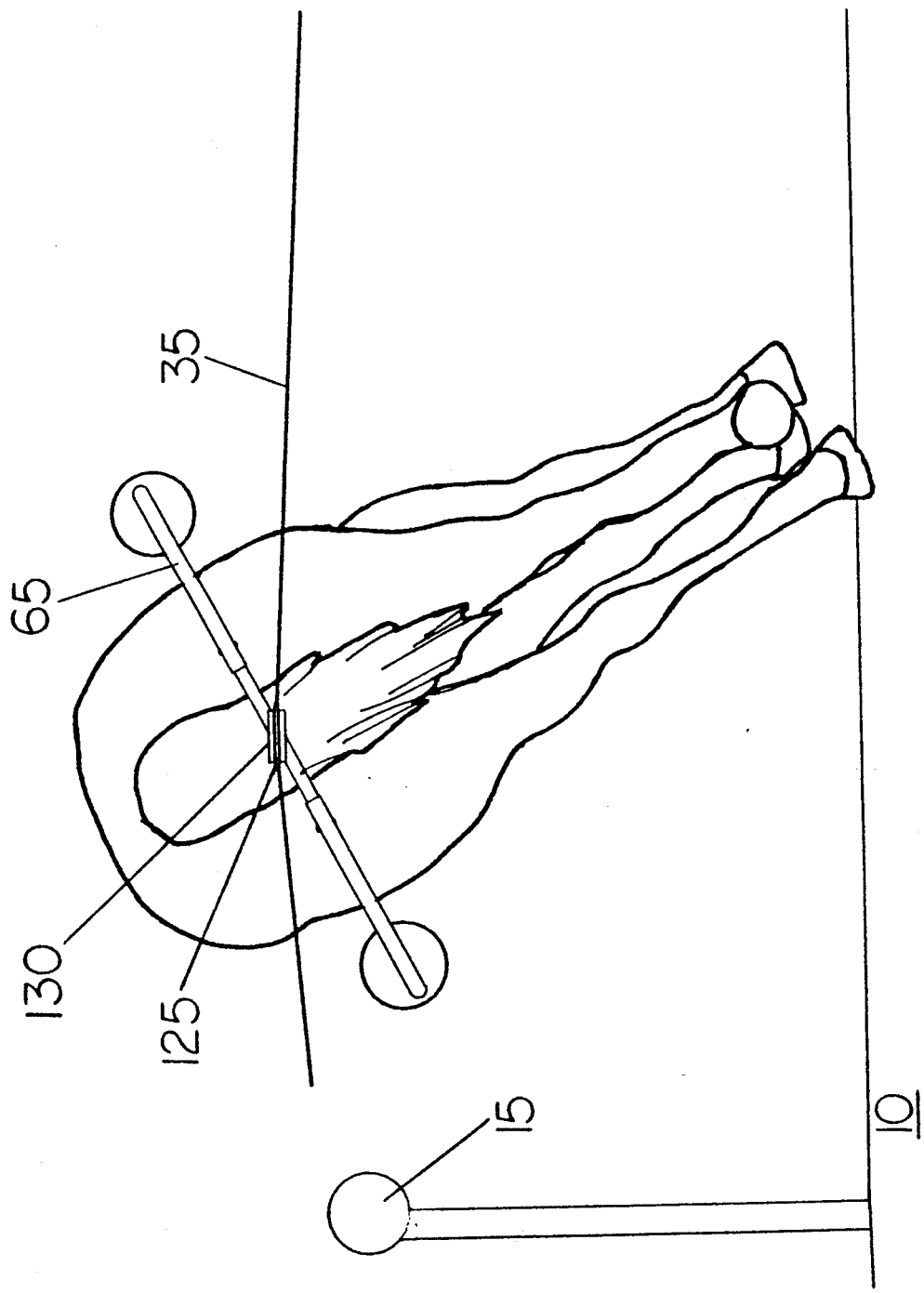
FIG. 11 is a pictorial depiction of the operation of the pivoting device in the harness shown in FIG. 5.

To improve the accuracy of the detection device 45 it is desirable that the movement arm 125 remain generally horizontal. To this end, the connection between the rig 65 and the arm 125 may include a pivoting unit 140. As may be seen more clearly in FIG. 10, pivoting unit 140 may include a face plate 145 rotating on bearings and a hinge 150. The action of pivoting unit 140 may be more clearly seen in FIG. 11 illustrating a horse leaning while moving on the exercise track 10.

Figure 12B:
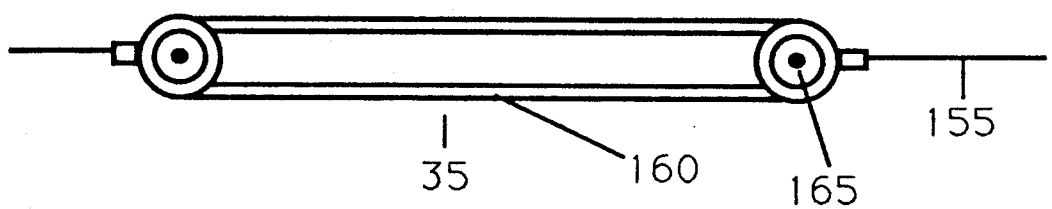

With reference now to FIGS. 12A and 12B, the tether 35 may include a flexible non-elastic cable 155. Additionally, to buffer the animal from any effects of sudden acceleration or deceleration, the tether 45 may include an elastic portion 160 that may be single-stranded or multi-stranded with a pulley 165 to ensure all strands respond equally. Tether length is dependent on the width of the track 10. Each tether is preferably as long as the track is wide to afford freedom of movement to the animal.

Further, tether length is also a factor in determining the magnitude of the force required to be produced by each restraining device. For example, with reference to FIG. 2, if angle A were smaller than shown therein (as when the tethers are shorter than shown), F1 and F2 would have to be larger than shown to produce the same Fr. Thus, longer tethers reduce the magnitude of the forces required to be produced by the restraining devices.

The restraining devices 40 each may include a brake for creating the forces F1 and F2. Each of the brakes may use a suitable braking device to create the forces F1 and F2 including, without limitation, a device that does not interact with the railings, such as one that creates aerodynamic drag or friction with the ground, a device that interacts with the railing to create friction, and a device that is propelled in the direction opposite to animal movement by conventional power sources or by linear induction (see, for example, the magnetic levitation system described in "All Aboard for the Future Express" in *Signal*, May 1988 at page 69). The aerodynamic brake is simple to build and maintain and is accordingly preferred.

As may be seen in FIGS. 13-16, an aerodynamic brake may include multiple movable louvers 170 and a frame 175. The frame may be slideably carried on railing 15 with appropriate rollers 180 and may be attached to tether 35. The frame and louvers may be streamlined so as to produce as little aerodynamic resistance as possible when the louvers are horizontal, as shown in FIG. 13. The frame and louvers may be constructed of lightweight composite materials. The angle of attack of each louver 170 (i.e. the angular difference between the chord 185 of a louver and the direction of the air reaching the louver) may be adjusted to vary the forces F1 and F2 provided by the restraining means. The maximum force may be provided by the restraining means 40 when the louvers have a 90° angle of attack (i.e., they are vertical), as may be seen in FIG. 14. Aerodynamic brakes have been found to create effective training resistance with running speeds of ten miles per hour or more.

The size of the aerodynamic brakes depends on the particular application. For example, a training program for a horse may require that the horse be subjected to about 70 pounds of net restraining force when traveling at about 30 miles per hour. To this end, each aerodynamic brake (such as the one illustrated in FIG. 16) should generate about 35 pounds of drag. When the drag coefficient $C_D$, of the aerodynamic brake is known (for the brake in FIG. 16, $C_D=1.4$), the surface area may be calculated using techniques known in the art. In this example, the surface area of each brake should be about 11 square feet to produce 70 pounds of net restraining force at 30 miles per hour.

A more detailed view of the restraining device 40 may be seen in FIGS. 15 and 16. Receiver 190 receives data signals from transmitter 50 or from control console 60 and responds by sending an appropriate electrical signal to servo 195. Such servos are known, for example, in radio-controlled model airplanes. The servo 195 controls movement of the louvers 170 through push rods 200. Pairs of louvers 170 may be moved oppositely in tandem so as not to create lift when the louvers are moved beyond horizontal. (See, for example, the louver position in FIG. 15).

The restraining device 40 may also include a friction brake for use when required. For example, the friction brake may be used when the animal is running too slowly to provide sufficient wind resistance. The friction brake may also be used to stop the restraining device when the animal stops suddenly so that the restraining device 40 does not run past the stopped animal. The friction brake may be set to engage automatically in such an event. A friction brake may include a second servo 205, a second push rod 210, and a braking lever 215 to frictionally engage one of the rollers 180 and/or rail 15.

An embodiment of the railing 15, rollers 180 and lower portion of the frame 175 may be more clearly seen with reference to FIG. 17. The axle 220 of each roller 180 may be slideably carried on support arms 225 that may have springs 230 to cushion the ride of the restraining device against railing abnormalities.

Power for the servos 195 and 205 may be provided by small batteries (not shown) or, with reference to FIG. 18, with a rail-carried conductive strip 235 that may convey electric power to the service when the strip 235 is wiped by a frame-carried wiper 240.

Operation of the present invention may be more clearly seen with reference to FIG. 19 illustrating a horse using an embodiment of the present invention with restraining devices providing aerodynamic drag. In this embodiment, the width of track 10 may be 40 feet or more. Tethers 35 may have lengths equal or greater than track width.

Under some circumstances it may be uncomfortable or impossible for the animal to carry the detection device and transmitter described heretofore. Accordingly, and in an alternative embodiment of the present invention that may be suitable for smaller animals as well as large animals as shown in FIGS. 20 and 21, a device for sensing Fr and lateral forces F3 and F4 may be located in the restraining devices, rather than the harness. A small and relatively simple harness 245 without a detection device and transmitter may be used. The harness may be of the type known in the art and may include belt 250 or vest 255 with appropriate detachable attachment devices 260. A tether 265 may be attached to moveable arm 270 carried by the restraining device 275 in this embodiment. As may be seen in FIGS. 20 and 21, one or two moving arms may be used.

When the animal is very small, such as a dog, the harness desirably distributes the restraining force over as much of the body as possible. To this end, a vest may be preferred for very small animals. The harness may include pivoting units, such as disclosed for the large animal harness, to avoid entanglement and afford greater freedom of movement.

In the embodiment shown in FIG. 21 the location of the running animal and the restraining force applied to it may be determined by a single arm 270 attached to a restraining device 280 that transmits restraining device 285 (not having a moveable arm) animal location information and/or commands to change the force provided by device 285. The location of the animal relative to the railings may be determined when the length of the tether 265 is known and the angle between the movement arm and the railing is determined.

As may be seen in FIGS. 22 and 23, the restraining devices with movement arms may include a position and force sensor 290, a computer 295 to compute the location of the animal and to calculate the forces F1 and F2 to be created by each of the restraining devices, a radio receiver 300 able to receive commands from the control console 60 for adjusting the magnitude of the restraining force Fr, and, if needed, transmitter 305 to transmit data or commands to restraining device 285. The position and force sensor 290 may provide an angular displacement data signal to the computer 295 that, knowing the length of the tether, computes the animal's location. The sensor 290 may also sense lateral and restraining forces conveyed by the tether. The computer may then solve the problem discussed in relation to FIGS. 2-4 and provide signals to the restraining devices to adjust their respective forces F1 and F2 to maintain Fr parallel to the center line of the track and to set and maintain the magnitude of Fr.

The present invention may use friction brakes to replace the aerodynamic brakes previously discussed. For example, disc brakes may be used to slow the motion of the rollers on the railing. As may be seen in FIG. 24, the rollers 310 may be connected with appropriate gear mechanism 315 to a disc brake assembly 320 having moveable disc pads 325 controlled by a computer 330 for determining the appropriate resistance to apply to the restraining device 335. Power for the unit may be supplied by batteries (not shown) or by conductive strips 340 and wipers 345. A receiver 347 may also be provided to receive commands from console 60 and/or transmitter 50.

Alternatively, as seen in FIG. 25 the restraining device 350 may be coupled directly to the rail 355, such as through gear 360. The gear 360 may run in a groove 365 in the railing 355. The groove may contain a chain such as a bicycle chain (not shown) or a belt which is grooved so that the gear 360 is directly coupled to the rail 355. Alternatively, the groove 365 may include plural transverse grooves (not shown) to match those in the gear 360, whereby the gear 360 engages the transverse grooves as the restraining device 350 is pulled by the animal over the rail 355. The gear 365, in turn, may drive belt 370 which may be coupled to an electromechanical braking system 375. The electromechanical braking system 375 may be of the type known in the art which precisely controls movement of the belt 370, as in the LIFE CYCLE, for example. As the electromechanical braking system may require more power that the previous embodiments this embodiment may be most efficiently used with the conductive wire and wiper technique disclosed in relation to FIG. 24.

The restraining device may include a linear induction system to provide resistance to movement. As is known, electromagnetic devices can be used to propel vehicles on a track. Such devices may also be used to provide a restraining force by propelling the restraining devices in the direction opposite the direction the animal is running. As may be seen in FIG. 26, such a system may include a linear induction motor 377 carried by the railing. A frame 379 with roller 381 may be carried by the railing and carry magnets 383 for reacting to the motor 377, thereby producing a force directed opposite to movement of an animal on the track.

The arrangement of the railing and the rollers in the restraining devices may be varied to suit the particular application in consideration of the environment and to keep the rollers clean and free moving. As may be seen in FIGS. 27 and 28, for example, the arrangement of the railing 15 and the number and location of the rollers 280 may be varied without limitation.

It may be appropriate in some applications to provide a restraining force that includes a vertical force vector pulling down on the animal at the point of attachment to provide better traction. Such a force may be needed when, for example, an animal is unable to create the added traction needed to pull the additional load imposed by the restraining devices. To this end, the restraining device may be mounted on or near the ground as shown in FIG. 29 or the restraining device may include an extension arm 385 as shown in FIG. 30. While the low railing shown in FIG. 29 may be more susceptible than a high railing to an increased amount of dirt and debris, it may be less susceptible to winds that may effect an aerodynamic restraining device.

With reference to FIG. 31 the system of the present invention may also include a rail cleaning device that includes a propulsion device 390 and rail cleaners 395, such as brushes.

While preferred embodiments of the present invention have been described it is to be understood that the embodiments described are illustrative only and that the scope of the invention is to be defined solely by the appended claims when accorded a full range of equivalents many variations and modifications naturally occurring to those skilled in the art from a perusal hereof.

I claim:

1. An exercise system for restraining a moving animal comprising:
   (a) two spaced-apart railings defining an exercise track therebetween;
   (b) two restraining means, each slidably carried by one of said two spaced-apart railings for providing a net restraining force; and
   (c) harness means for restraining an animal moving on said exercise track, and attached to said two restraining means and adapted to be worn by an animal so that the net restraining force is conveyed to a moving animal wearing said harness means on said exercise track.

2. The system as defined in claim 1 further comprising aligning means for aligning the net restraining force generally parallel to the center line of said two spaced-apart railings.

3. The system as defined in claim 2 wherein said aligning means comprises: detection means for sensing the forces conveyed to an animal wearing said harness means that are perpendicular to said center line; and regulation means for regulating each of said two restraining means responsive to the sensed perpendicular forces so that the net restraining force is aligned generally parallel to said center line.

4. The system as defined in claim 2 wherein said aligning means comprises control means for controlling the magnitude of the net restraining force.

5. The system as defined in claim 4 wherein said control means comprises force adjusting means for adjusting the magnitude of the net restraining force during movement of an animal wearing said harness means on said exercise track.

6. The system as defined in claim 1 further comprising control means for controlling the magnitude of the net restraining force.

7. The system as defined in claim 6 wherein said control means comprises means for adjusting each of said two restraining means so that the magnitude of the net restraining force is controlled.

8. The system as defined in claim 6 wherein said control means comprises force adjusting means for adjusting the magnitude of the net restraining force during animal exercise on said exercise track.

9. The system as defined in claim 1 wherein at least one of said two restraining means comprises a brake for creating a variable amount of resistance to movement of one of said two restraining means, said resistance not being created by interaction of said brake with one of said two railings.

10. The system as defined in claim 9 wherein said brake comprises an aerodynamic brake for creating a variable amount of aerodynamic drag.

11. The system as defined in claim 9 further comprising a second brake for creating further resistance to movement of one of said two restraining means by interacting with one of said two railings.

12. The system as defined in claim 1 wherein at least one of said two restraining means comprises a brake for creating a variable amount of resistance to movement of one of said two restraining means, said resistance being created by interaction of said brake with one of said two railings.

13. The system as defined in claim 12 wherein said brake comprises a friction brake for creating a variable amount of frictional resistance.

14. The system as defined in claim 12 wherein said brake comprises a magnetic brake for creating a variable amount of magnetic resistance.

15. The system as defined in claim 1 wherein said defined exercise track is endless.

16. The system as defined in claim 1 further comprising means for providing a downward force vector to an animal wearing said harness means.

17. The exercise system as defined in claim 1 wherein at least one of said two restraining means comprises a propulsion device.

18. An exercise system for training an animal comprising:
   (a) two spaced-apart railings defining an exercise track therebetween;
   (b) two restraining means, each slidably carried by one of said two spaced-apart railings, for providing a net restraining force opposing movement of an animal on said exercise track, each of said two restraining means having braking means for creating the net restraining force by variably resisting movement of one of said two restraining means;
   (c) harness means attached to said two restraining means and adapted to be worn by an animal for conveying the net restraining force to an animal moving on said exercise track; and
   (d) centering means for aligning the net restraining force generally parallel to the center line of said two spaced-apart railings, said centering means comprising,
      detection means carried by said harness means for sensing forces perpendicular to said center line to said two spaced-apart railings,
      transmission means carried by said harness means for transmitting a signal to receiver means in at least one of said two restraining means, said signal conveying data related to said location to at least one of said two restraining means, and
      regulation means carried by at least one of said restraining means for variably regulating the resistance provided by said braking means responsive to the sensed perpendicular forces so that the net restraining force is aligned generally parallel to said center line.

19. The system as defined in claim 18 wherein said detection means comprises at lease one moveable arm and means for detecting angular displacement of said moveable arm.

20. The system as defined in claim 19 wherein said detection means further comprises swivel means for maintaining said moveable arm generally horizontal when said harness means is not horizontal.

21. The system as defined in claim 18 wherein said harness means comprises a generally V-shaped rig adapted to be worn by an animal with the distal ends thereof carried on the forward flanks of the animal and the apex carried rearwardly of the animal, and tether means attached to said apex and to said two restraining means for conveying the net restraining force.

22. The system as defined in claim 21 wherein each of said distal ends of said V-shaped rig comprises means for pivotably and rotatably carrying said distal ends so that said apex remains relatively stable during movement of an animal wearing said harness means and so that said distal ends conform to the flanks of the animal.

23. An exercise system for training an animal comprising:

(a) two spaced-apart railings defining an exercise track therebetween;

(b) two restraining means, each slidably carried by one of said two spaced-apart railings, for providing a net restraining force opposing movement of an animal on said exercise track, each of said two restraining means having braking means for creating the net restraining force by variably resisting movement of one of said two restraining means;

(c) harness means attached to said two restraining means and adapted to be worn by an animal for conveying the net restraining force to an animal moving on said exercise track; and (d) centering means for aligning the net restraining force generally parallel to the center line of said two spaced-apart railings, said centering means comprising, detection means carried by at least one of said two restraining means for providing a signal related to the location of an animal wearing said harness means relative to the center line of said two spaced-apart railings, regulation means carried by at least one of said two restraining means for variably regulating the resistance provided by one of said braking means responsive to the provided signal so that the net restraining force is aligned generally parallel to said center line.

24. The system as defined in claim 23 wherein said detection means comprises a movable arm and means for detecting angular displacement of said movable arm, the angular displacement being related to the location of the animal.

25. The system as defined in claim 24 wherein said harness means comprises a tether attached to said movable arm and carried by an animal on said exercise track so that movement of said movable arm is related to movement of an animal related to said two spaced-apart railings.

26. An exercise system for an animal moving on an exercise track comprising means for providing a net restraining force that restrains an animal moving on said exercise track, the direction of the net restraining force being generally parallel to the center line of said exercise track when the animal is not moving on and generally parallel to said center line.

27. An exercise system for restraining an animal moving on an exercise track comprising:

(a) two spaced-apart railings defining said exercise track; and (b) means carried by each of said railings for providing a net force parallel to the center line of said track and opposing the animal's motion.

28. The system as defined in claim 27 further comprising means for varying the magnitude of the net force when an animal is moving on said track.

29. The exercise system as defined in claim 25 wherein said means for providing a force comprises a propulsion device.

30. A system for restraining movement of an animal on an exercise track comprising:

(a) a railing generally coincident with said exercise track;

(b) plural louvers in a frame slidably carried by said railing for providing aerodynamic drag to restrain an animal on said exercise track; and (c) harness means attached to said frame and adapted to be worn by an animal on said exercise track for conveying said aerodynamic drag to an animal wearing said harness means.

31. The system as defined in claim 30 wherein said frame comprises means for adjusting the angles of attack of said plural louvers.

32. The system as defined in claim 31 wherein said frame further comprises means for providing a signal related to the location of an animal wearing said harness means relative to said railing, and means for adjusting the angles of attack of said plural louvers responsively to the provided signal.

33. A system for restraining movement of an animal on an exercise track comprising:

(a) a railing generally coincident with said exercise track;

(b) restraining means carried by said railing for providing aerodynamic drag to restrain an animal on said exercise track; and (c) harness means attached to said restraining means and adapted to be worn by an animal on said exercise track for conveying said aerodynamic drag to an animal wearing said harness means.

34. The system as defined in claim 33 wherein said restraining means comprises means for adjusting the coefficient of drag of said restraining means to vary the amount of aerodynamic drag provided.

35. In an exercise system that restrains an animal moving on an exercise track the improvement comprising means for substantially reducing the net of forces perpendicular to the center line of said exercise track when the animal is not moving parallel to the center line.

36. A method for conditioning an animal to run faster comprising the steps of:

(a) providing an exercise track for an animal between two spaced-apart railings;

(b) slideably mounting a restraining means on each of said two spaced-apart railings for providing a net restraining force restraining movement of an animal on said track;

(c) sensing forces perpendicular to said two spaced-apart railings;

(d) resisting movement of at least one of said restraining means with braking means responsive to said sensed perpendicular forces so that the direction of the net restraining force is generally parallel to the center line of said exercise track;

(e) attaching harness means to said restraining means and to an animal on said exercise track for conveying the net restraining force, whereby running movement of an animal in said means is restrained by the net restraining force so that the animal is conditioned to run faster when not in said harness means.

37. The method as defined in claim 36 further comprising the step of variably controlling the resistance provided by said brake means so that the magnitude of the net restraining force is controlled.

38. A method for increasing the running speed of an animal comprising the steps of:

(a) defining an exercise track for an animal; and (b) opposing running movement of an animal on said defined exercise track with a net restraining force having a direction generally parallel to the center line of said defined exercise track when an animal is not on and moving generally parallel to the center line of said defined exercise track, whereby running movement by an animal is opposed by the net restraining force and the animal's running speed increases when not opposed by the net restraining force.

39. A method for increasing the running speed of an animal comprising the steps of:

(a) defining an exercise track for an animal with two spaced-apart railings; and
(b) opposing running movement of an animal on said defined exercise track with a restraint provided by braking means carried by each of said railings that create a net force parallel to the center line of said exercise track and opposing the animal's motion.

* * * * *